(12) United States Patent
Leung

(10) Patent No.: US 6,769,114 B2
(45) Date of Patent: Jul. 27, 2004

(54) METHODS AND APPARATUS FOR PREVENTING SOFTWARE MODIFICATIONS FROM INVALIDATING PREVIOUSLY PASSED INTEGRATION TESTS

(76) Inventor: Wu-Hon Francis Leung, 1936 Elmore Ave., Downers Grove, IL (US) 60515

( * ) Notice: Subject to any disclaimer, the term of this patent is extended or adjusted under 35 U.S.C. 154(b) by 597 days.

(21) Appl. No.: 09/861,392

(22) Filed: May 18, 2001

(65) Prior Publication Data

US 2002/0066077 A1 May 30, 2002

Related U.S. Application Data
(60) Provisional application No. 60/205,766, filed on May 19, 2000.

(51) Int. Cl.[7] .............................................. G06F 9/44
(52) U.S. Cl. .................................................... 717/124
(58) Field of Search ............................... 717/124–135; 712/227; 714/799–824, 37–39

(56) References Cited

U.S. PATENT DOCUMENTS

| | | | | |
|---|---|---|---|---|
| 5,966,541 A | * | 10/1999 | Agarwal | 717/132 |
| 6,349,393 B1 | * | 2/2002 | Cox | 717/128 |
| 6,351,826 B1 | * | 2/2002 | Kato | 717/126 |
| 6,510,402 B1 | * | 1/2003 | Logan et al. | 714/38 |
| 6,601,018 B1 | * | 7/2003 | Logan | 717/124 |
| 6,647,513 B1 | * | 11/2003 | Hekmatpour | 714/37 |

OTHER PUBLICATIONS

Rothermel et al. Selecting Regression Tests for Object–oriented Software. IEEE. 1994. pp. 14–25.*
Li et al. An Overview of Regression Testing. ACM. 1999. pp. 69–73.*
Korel et al. Automated Regression Test Generation. ISSTA. 1998. pp. 143–152.*
Rothermel et al. A Safe, Efficient Regression Test Selection Technique. ACM. 1997. pp. 173–210.*
International Search Report dated Jan. 18, 2002.
Boris, Beizer "Software Testing Techniques—2nd Editon", Van Norstrand Reinhold, New York, NYpp. 452–459 (1990).
Demillo et al., "Software Testing and Evaluation", The Benjamin/Cummings Publishing Company, Inc., Menlo Park, CA pp. 143–150 and 172–177 (1987).
Kaiser et al., "Infuse: Fusing Integration Test Management with Change Management", Proceedings of the Annual International Computer Software and Applications Conference (COMPSAC), Orlando, FL pp. 552–558 (Sep. 20, 1989).

* cited by examiner

Primary Examiner—Wei Zhen
(74) Attorney, Agent, or Firm—Marshall, Gerstein, Borun LLP

(57) ABSTRACT

A software tool and methods for preventing software modifications from invalidating previously passed integration test cases is provided. The software tool and methods automatically modify an integrated software subroutine to collect test data for selected units of the integrated software. The software tool and methods also generate a software test environment including a driver and one or more stubs for each selected software unit. Subsequent versions of the software unit are then stimulated by the driver and stubs using the collected test data. The responses from the new version of the software unit are compared to the responses collected from the old version. Differences between the responses of the two software version are flagged, thereby preventing software modifications on the software unit from invalidating previously passed tests. Furthermore, the software tool and methods automate the incremental integration and testing of software units whose modifications are related. The software tool and methods automatically determines the set of software units to be combined, the set of test cases to exercise and the test results that must be satisfied so that previously passed integration tests will not fail. Several methods of reducing the potentially unbounded test data to a manageable amount are also described. The test data may be used to analyze important properties of the software. The test data and test environment are useful in several different phases of software development.

42 Claims, 22 Drawing Sheets

Subroutine A ()
{
 •
 •
 retB = B (arg1);
 •
 •
}

FIG. 4

Subroutine A ()
{
 •
 •
 store (B-input);
 retB = B (arg1);
 store (B-output);
 •
 •
}

FIG. 5

Unit Test Data for Subroutine B
  Test case id1:

Context id1 (Called from subroutine i, statement j,
      nil or loop id, nil or original program);
    Values of arguments received;
    Values of external variables received;
    Values of static variables at invocation;

Calling subroutine C;
      Values of arguments passed;
      Values of external variables passed;
      Return values of C;
      Values of external variables updated;

Calling subroutine D;
          •
          •

Context id2 (etc.)
          •
          •

Test case id2:
          •
          •

FIG. 6

Subroutine A ()
{
　　•
　　•
```
for ( int i = 1; i < N; i ++) {
        int retF = F (arg1[i]);
        int retB = B (arg2, retF);
}
```
　　•
　　•
}

FIG. 8

Extern int retF, retB;

Subroutine Bloop (arg1[], arg2, N)
{
　for (int i = 1; i < N; i++) {
　retF = F(arg1[i]);
　retB = B(arg2, retF);
}

FIG. 9

Subroutine A ()
{
　　•
　　•
　　store (B-input and identify this to be compared with original source method);
　　retB = B (arg1);
　　store (B-output);
　　•
　　•
}

FIG. 14

Subroutine B ()
{

```
for (int i == 1; i< N; i++) {
    test case selection enabler;
    if (somecondition) {
        test case selection enabler;
        arg = x;
    }
    capture input data if enabled;
    retC = C (arg);
    capture return data if enabled;

METHODS AND APPARATUS FOR PREVENTING SOFTWARE MODIFICATIONS FROM INVALIDATING PREVIOUSLY PASSED INTEGRATION TESTS

RELATED APPLICATION

This application claims priority from U.S. Provisional Application Ser. No. 60/205,766 filed May 19, 2000 and which is hereby incorporated herein by reference.

TECHNICAL FIELD

The present invention relates in general to automatic software testing and, in particular, to methods and apparatus for preventing software modifications from invalidating previously passed integration tests.

BACKGROUND

Most software programs are changed from one version to the next to implement new functionality, to improve performance, and to correct defects. Very often, a software change will lead to modifications in several different subroutines.

Once a software change is made, the modification may unintentionally affect previously tested functionality. For large and complex software, this inadvertent destruction happens quite often. As a result, during integration testing of the modified software, two sets of integration test cases are exercised. A set of regression test cases are performed to determine if previously tested functionality is still in tact after the new modifications. In addition, a set of functional test cases are performed to determine if the modification produces the new desired results.

If an error is found during the integration testing, changes made to the software to fix the error may in turn unintentionally destroy other tested functionality. A large software project typically goes through several cycles of "modify and test" before the number of errors found "converges" to a satisfactory low threshold. For many large projects, running the previously passed integration tests requires a substantial investment of time (e.g., weeks to months). As a project release date approaches, the development team often decides not to rerun all the previously passed tests in an effort to save time. To contain the risk of unintentionally destroying previously passed tests, they typically decide to accept only a portion of the program modifications for new functionality or bug fixes. These decisions compromise the integrity of the software product. After an extensive review of the development processes of two of the premiere software companies, Cusumano and Yoffie describe these pitfalls in their paper, "Software Development in Internet Time" which is incorporated herein by reference.

It is well known that the cost to find and fix a software error increases exponentially as the software development process progresses through coding, unit testing, subsystem integration testing, and system integration testing. The book, "Software Engineering Economics", by Barry Boehm and published by Prentice-Hall in 1981, which is incorporated herein by reference, gives many such examples.

A typical software project may devote one third of the available human resources and time to integration testing. In the earlier stages of development, it is typically up to the individual programmer to develop his/her own test cases and unit test environment. Because of lack of resources and time, unit test cases are typically not as extensive as integration test cases. In particular, there is no automatic tool that can help the programmer to check whether what they are working on is in conflict with previously passed tests and with the work of other programmers until integration time. In other words, software projects typically are not effective in taking advantage of the cost and time savings in finding more errors earlier in the development process.

Some earlier attempts at solving software testing problems include methods to automate test execution such as by recording and playing back graphical user interface manipulations as disclosed in U.S. Pat. No. 5,511,185 and U.S. Pat. No. 5,600,789 (both incorporated herein by reference). Others attempt to reduce the number of test cases based on how the software was modified. The article, "Analyzing Regression Test Selection Techniques," by Rothermel et al in IEEE Transaction on Software Engineering, August 1996, discusses many such methods, and U.S. Pat. No. 5,694,540 describes one such method (both incorporated herein by reference). Still other methods generate a test environment (stubs and drivers) for unit testing such as the AUT system for Cobol programs in early IBM systems as documented in the book "Software Testing and Evaluation", by DeMillo et al., which is incorporated herein by reference. Still others consider generating test data automatically generated by analyzing source code. The article, "Techniques for Automated Test Data Generation," by C. V. Ramamoorthy et al, published in the Conference Record of the Ninth Asilomar Conference on Circuits, Systems an Computers in November, 1975 described a number of these methods.

However, prior art software testing methods suffer form certain drawbacks. For example, prior art methods do not prevent new software modifications from unintentionally failing previously passed integration tests. Further, they do not take advantage of the fact that software testing is easier and less costly during unit testing than during integration testing.

BRIEF DESCRIPTION OF THE DRAWINGS

Features and advantages of the disclosed methods and apparatus will be apparent to those of ordinary skill in the art in view of the detailed description of exemplary embodiments which is made with reference to the drawings, a brief description of which is provided below.

FIG. 4 is an exemplary subroutine before data collection instructions are inserted.

FIG. 5 is the exemplary subroutine of FIG. 4 after data collection instructions have been inserted.

FIG. 6 is an exemplary data structure used to store test data.

FIG. 8 is exemplary software code showing a subroutine under test being called from within a loop.

FIG. 9 is the exemplary code of FIG. 8 after being modified to treat the loop as a substitute for the subroutine under test.

FIG. 14 is exemplary software code showing a subroutine modified to facilitate comparison with a previous version of the software code.

FIG. 15 is exemplary software code showing a subroutine modified to facilitate selective collection of test data from a loop according to predefined criteria.

DETAILED DESCRIPTION OF EXEMPLARY EMBODIMENTS

Figure 1:
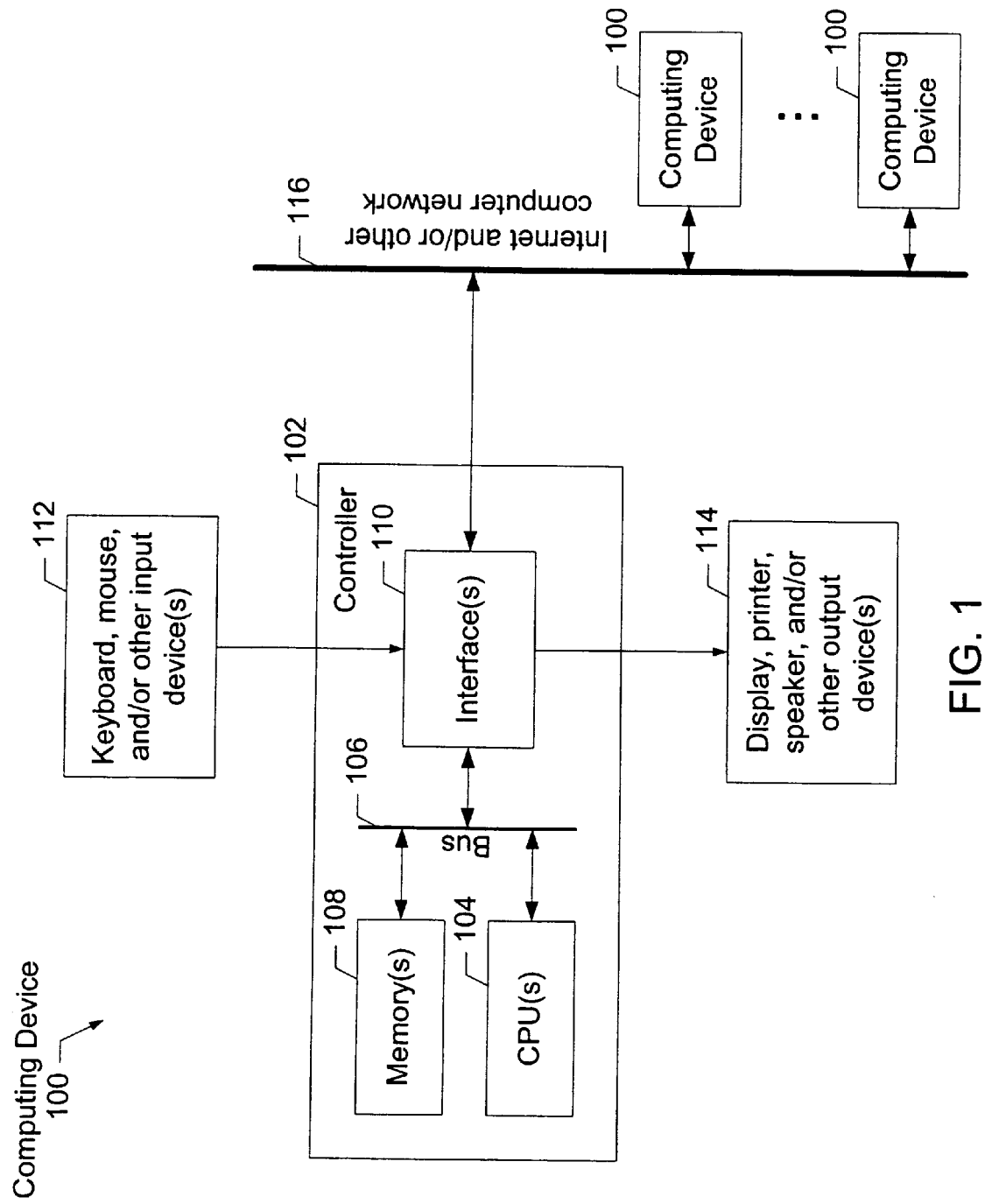
FIG. 1 is a block diagram of a computing device shown in an exemplary environment of use.

In general, the methods and apparatus described herein allow a software developer to collect software test data, generate a software test environment, and prevent software modifications from invalidating previously passed integration tests. For the purpose of simplicity in explanation only, a subroutine as a base program unit of modification will be used in the discussion that follows. Of course, a person of ordinary skill in the art will readily appreciate that any unit of software, such as an identified class, block, or module may be tested according to the methods and apparatus described herein. Preferably, software unit identifiers are standardized. For example, if the software unit identifiers are language keywords, a compiler or a software tool can easily recognize the keywords. An "integrated software" as used herein comprises a collection of subroutines (or other software units). An integration test is a test administered to an integrated software.

In the preferred embodiment, an add-on to a software compiler, or a separate software tool, inserts code to capture test data immediately before a subroutine is called and immediately after the subroutine returns. When the subroutine calls other subroutines, the tool also inserts code to capture test data immediately before and after those subroutines are called during an integration test. The test data collected includes data values going into the subroutines and data values coming out of the subroutines in the form of passed/returned parameters and/or external variables. In addition, the sequence of subroutines called by the subroutine under test may be collected. Because the inserted test code does not change the logic of the subroutine being tested, previously passed integration tests will continue to pass. As each integration test case is executed, the corresponding test data for the individual subroutines may be stored in a database. We shall call these test data unit regression test cases.

An integration test case supplies the input for the execution of the integrated software and expected output of the execution. An integration test case passes if given its input, the result of the execution matches the expected output of the test case. Otherwise the test case fails. As an example, the input of an integration test case to test the invocation of the three way calling feature of a telephone system would specify an off-hook signal, a first telephone number, a flash signal and a second telephone number. The expected output would specify a dial tone after the off-hook signal, a connection after the first telephone number, a dial tone after the flash signal, and a three-way connection after the second telephone number.

Preferably, the testing tool also generates a driver and one or more stubs for each subroutine (or a selected set of subroutines) under test. The driver, the stubs, and the subroutine may be compiled into an executable. If the subroutine is subsequently modified, the driver and stubs for the subroutine may use the stored unit regression test cases to test the modifications. Preferably, the programmer cannot submit the modification to further system integration until the modifications pass all the unit regression test cases. For each modified subroutine, a unit regression test case preferably corresponds "one to one" to an integration test case.

A subroutine may be modified by changing the interface of the subroutine and/or changing the body of the subroutine. In an integrated software, if the interface of one of its subroutines is modified, there exists at least another subroutine, which calls the subroutine with the modified interface, that is also modified. In the preferred embodiment, the software tool and method will automatically put modified subroutines that are related into an incremental integration workspace after their unit testings meet certain requirements. The software tool and method will automatically combine the appropriate subroutines to form incremental integration software and generate the drivers and stubs for them. The software tool and method will derive test cases for the incremental integration software from the unit regression test cases of the subroutines and automatically execute the testing of the incremental integration software. Furthermore, the software tool and method specifies test result conditions that the incremental integration software must meet before the modified subroutines may be submitted for integration test to prevent the modifications from invalidating previously passed integration tests.

A subroutine can fail a unit regression test because of an interface error and/or a calling sequence error. In an interface error, the value of one or more parameters, return values or external variables passed from one subroutine to another subroutine are not the same as the recorded test data. In a calling sequence error, the sequence of other subroutines called by the subroutine under test are not the same as the recorded test data.

The software testing tool is preferably executed by a computing device. A block diagram of a computing device 100 is illustrated in FIG. 1. Preferably, the computing device 100 is a personal computer (PC) or a server. The computing device 100 includes a controller 102 which preferably includes a central processing unit 104 electrically coupled by an address/data bus 106 to a memory device 108 and an interface circuit 110. The CPU 104 may be any type of well known CPU, such as an Intel Pentium™ processor. The memory device 108 preferably includes volatile memory and non-volatile memory. Preferably, the memory device 108 stores the software being tested (e.g., old and new version of a subroutine) and the test software (e.g., data collection instructions, drivers, and stubs). This software may be executed by the CPU 104 in a well known manner. The memory device 108 may also store test data. Alternately, an external database may be used to store test data.

The interface circuit 110 may be implemented using any type of well known interface standard, such as an Ethernet interface and/or a Universal Serial Bus (USB) interface. One or more input devices 112 may be connected to the interface circuit 110 for entering data and commands into the controller 102. For example, the input device 112 may be a keyboard, mouse, touch screen, track pad, track ball, isopoint, and/or a voice recognition system.

One or more displays, printers, speakers, and/or other output devices 114 may also be connected to the controller 102 via the interface circuit 110. The display 114 may be cathode ray tube (CRTs), liquid crystal displays (LCDs), or any other type of display. The display 114 generates visual displays of data generated during operation of the computing device 100. The display 114 is typically used to show test results. The display may also show prompts for human operator input, run time statistics, calculated values, detected data, etc. The computing device 100 may also exchange data with other devices via a connection to a network 116. For example, the computing device 100 may exchange subroutines and test data with other computing devices associated with a team of software developers. The network connection may be any type of network connection, such as an Ethernet connection, digital subscriber line (DSL), telephone line, coaxial cable, etc.

Figure 2:
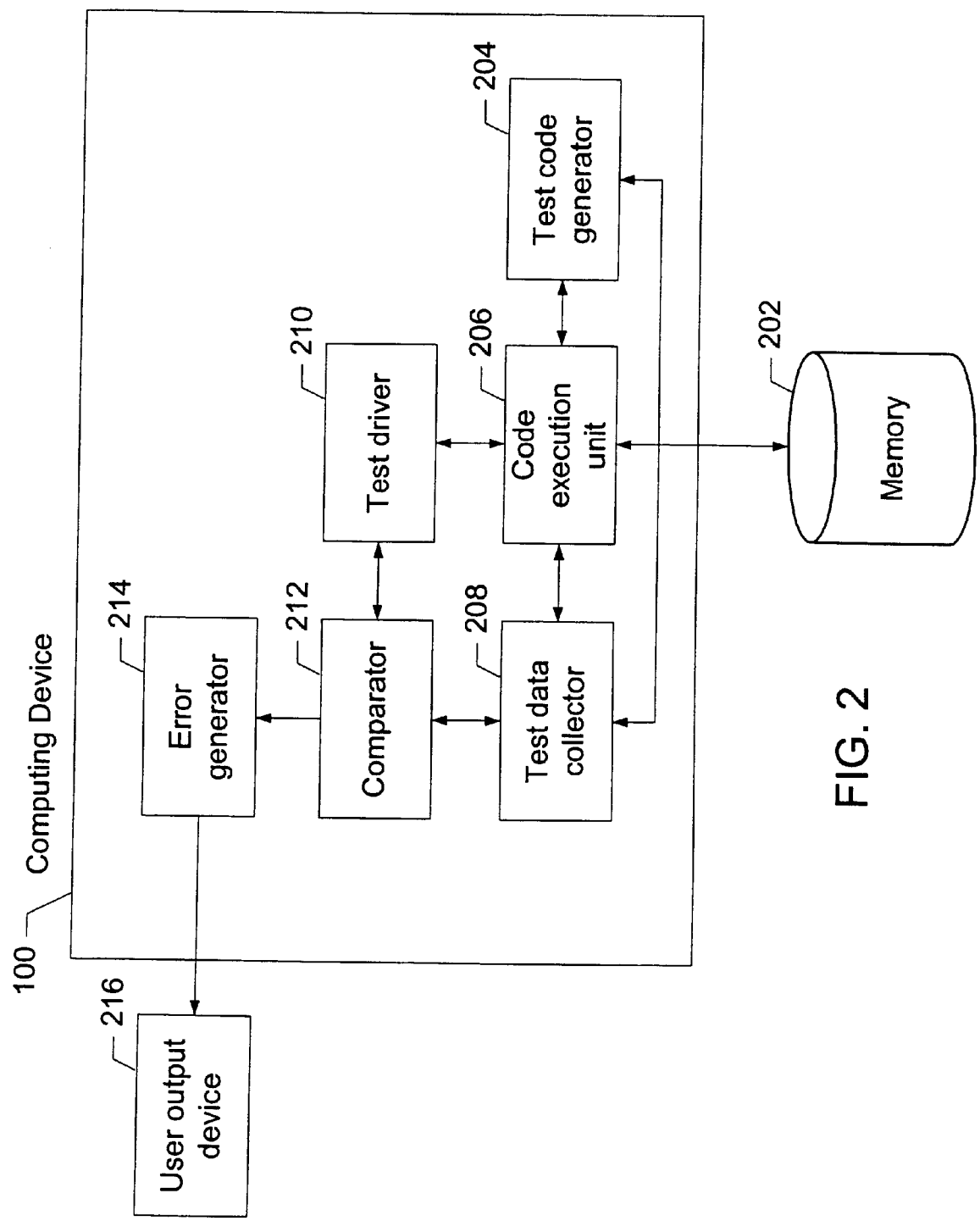
FIG. 2 is a block diagram of another computing device shown in an exemplary environment of use.

A block diagram of another computing device 200 is illustrated in FIG. 2. The computing device 200 includes a plurality of interconnected blocks 202–216. Each of the blocks may be implemented by a microprocessor executing software instructions and/or conventional electronic circuitry. In addition, a person of ordinary skill in the art will readily appreciate that certain blocks may be combined or divided according to customary design constraints.

For the purpose of storing an old version of a subroutine and a new version of the subroutine, the computing device 200 includes a memory device 202. The memory device 202 may include volatile and/or non-volatile memory. For example, the memory device may be random access memory (RAM) and/or magnetic media such as a hard drive.

For the purpose of generating subroutine entry data collection instructions and subroutine exit data collection instructions, the computing device 200 includes a test code generator 204. The subroutine entry data collection instructions preferably cause a microprocessor to record the values of one or more input parameters passed to one or more versions of a subroutine. The subroutine exit data collection instructions preferably cause a microprocessor to record the values of one or more output parameters returned by one or more versions of a subroutine. Input parameters may be parameters passed to a subroutine when the subroutine is called, external variables used by the subroutine, and/or parameters returned to the subroutine from another subroutine as described in detail below. Output parameters may be parameters returned by the subroutine after the subroutine is called, external variables used by the subroutine, and/or parameters passed to another subroutine called by the subroutine under test as described in detail below.

For the purpose of executing the old version of the subroutine and the new version of the subroutine, the computing device 200 includes a code execution unit 206. The code execution unit 206 is operatively coupled to the memory device 202 and the test code generator 204. The code execution unit 206 processes the instructions of the old subroutine and data collection instructions in order to generate first test data. The code execution unit 206 processes the instructions of the new subroutine, a driver, and one or more stubs in order to stimulate the new subroutine and generate second test data. The instructions may be any type of well known software instructions.

For the purpose of collecting the first test data and the second test data, the computing device 100 includes a test data collector 208. The test data collector 208 is operatively coupled to the code execution unit 206. The test data collector 208 records the value of one or more input parameters passed to the old version of the subroutine. The test data collector 208 also records the value of one or more output parameters returned by the old version of the subroutine. Subsequently, the test data collector 208 records the value of one or more output parameters returned by the new version of the subroutine.

For the purpose of stimulating the new version of the subroutine with previously recorded test data, the computing device 200 includes a test driver 210. The test driver 210 is operatively coupled to the code execution unit 206. The test driver 210 passes one or more recorded values of input parameters to the new version of the subroutine in order to generate one or more output values from the new version of the subroutine.

For the purpose of determining test results, the computing device 200 includes a comparator 212. The comparator 212 is operatively coupled to the code execution unit 206. The comparator 212 compares the recorded value of the output parameter(s) returned by the old version of the subroutine to the recorded value of the output parameter(s) returned by the new version of the subroutine.

For the purpose of communicating the test results to a user output device 216, the computing device 200 includes an error generator 214. The error generator 214 is operatively coupled to the comparator 212. The error generator 214 generates an electrical error signal if the recorded value of an output parameter returned by the old version of the subroutine does not match the recorded value of the output parameter returned by the new version of the subroutine.

For the purpose of communicating the test results to a user, the computing device 200 includes a user output device 216. The user output device 216 is operatively coupled to the error generator 214. The user output device 216 converts the electrical error signal into a human perceivable error signal. For example, the user output device 216 may be a display, a printer, a speaker, and/or other well known user output devices.

Figure 3:
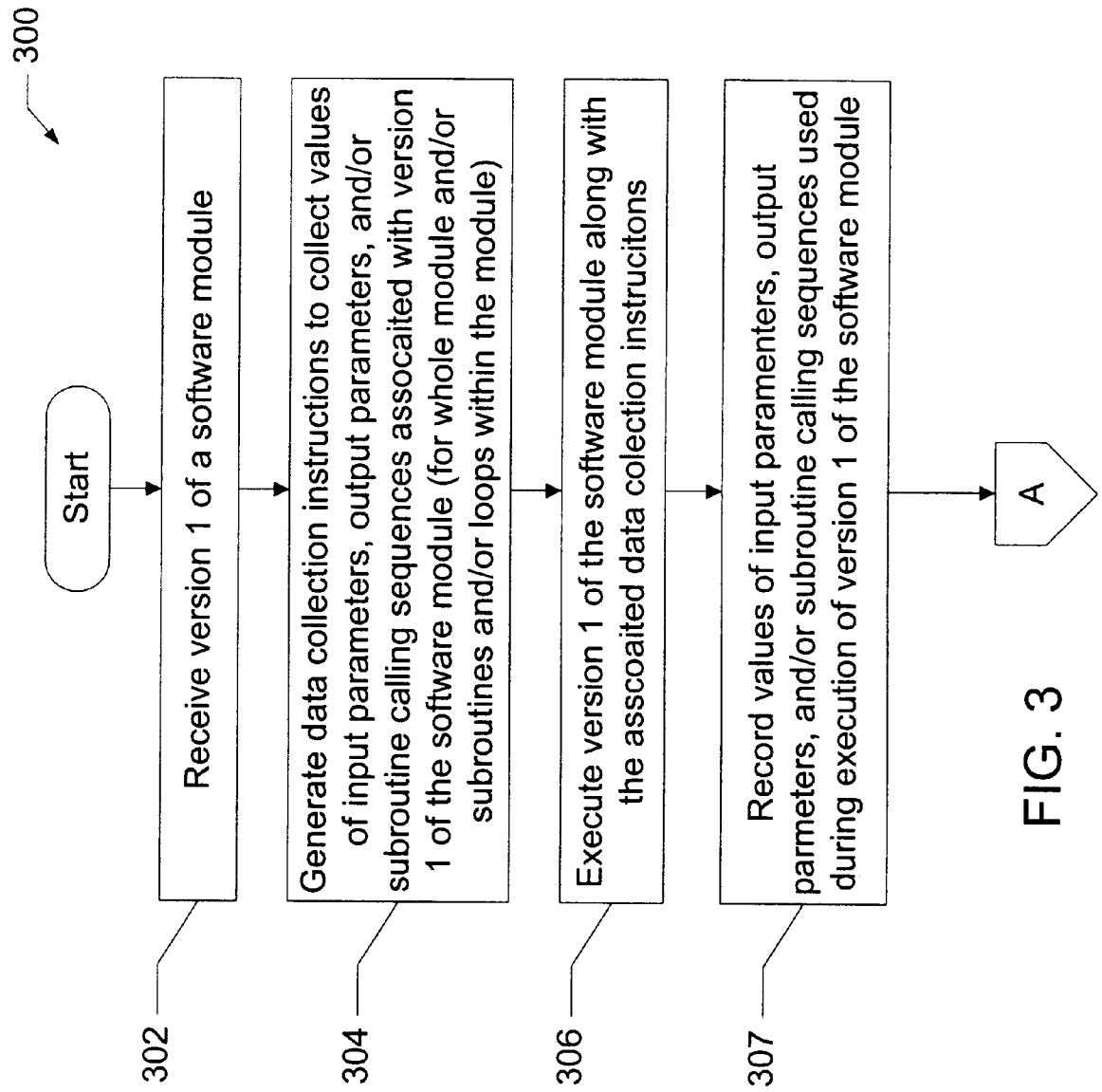
FIG. 3 is a flowchart of a process for collecting software test data, generating a software test environment, and preventing software modifications from invalidating previously passed tests.
Figure 3:
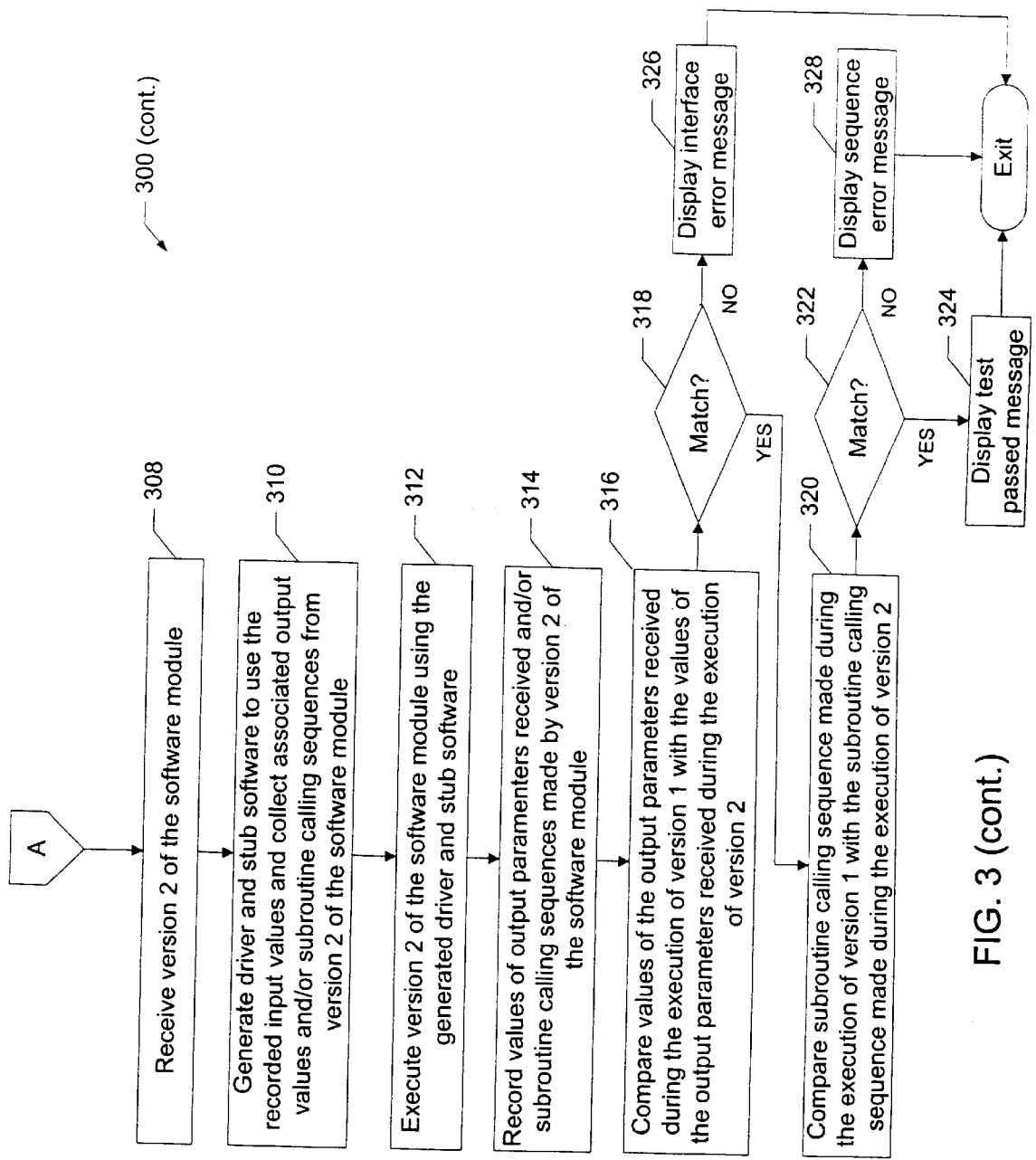

A flowchart of a process 300 for collecting software test data, generating a software test environment, and preventing software modifications from invalidating previously passed integration tests is illustrated in FIG. 3. Preferably, the process 300 is embodied in a software program which is stored in the computing device memory 108 and executed by the computing device CPU 104 in a well known manner. However, some or all of the steps of the process 300 may be performed manually and/or by another device. Although the process 300 is described with reference to the flowchart illustrated in FIG. 3, a person of ordinary skill in the art will readily appreciate that many other methods of performing the acts associated with process 300 may be used. For example, the order of many of the steps may be changed without departing from the scope or spirit of the present invention. In addition, many of the steps described are optional.

Generally, the process 300 causes the computing device CPU 104 to modify an integrated software to collect unit regression test cases for selected subroutines of the integrated software. The process 300 then causes the CPU 104 to generate a software test environment including a driver and one or more stubs for each of the selected subroutines in the integrated software. Subsequent versions of the subroutines are then stimulated by the driver using the collected unit regression test cases. The responses from the new versions of the subroutines are then collected by the driver and the stubs and compared to the responses collected from the old versions. Differences between the responses are flagged, thereby preventing software modifications from invalidating previously passed integration tests.

The process 300 begins when a computing device 100, 200 receives all of the subroutines required for an integrated software, including a first version of a "particular" subroutine (step 302). The testing of this "particular" subroutine is traced in the description below for simplicity in explanation only. A person of ordinarily skill in the art will readily appreciate that in practice all modified subroutines from an integrated software are preferably tested in the manner described for the "particular" subroutine.

The term "first version" and "second version" as used herein do not mean literally the first version ever and the version immediately following the first version. The terms are merely relative identifiers to distinguish any version of a particularly subroutine (version 1) from some different version of the subroutine (version 2). There may be many other versions of the subroutine before and/or after version 1 and/or version 2.

The term "integrated software" as used herein may be any logical grouping of software including many individual subroutines (e.g., one subroutine calling another subroutine). Each integrated software is part of a larger software project which uses a plurality of integrated softwares at various stages of development. The integrated software may be received by the computing device 100, 200 in any well known manner. For example, one or more subroutines may be entered into the computing device 100, 200 by a person using an input device 112, such as a keyboard. Similarly, one or more subroutines may be received via a network 116. Further, one or more subroutines may be transferred to the computing device 100, 200 via a removable memory device, such as a magnetic disk, an optical disk, or a memory card.

Once the integrated software is received at the computing device 100, 200, the computing device 100, 200 automatically generates a set of data collection instructions for one or more subroutines within that integrated software (step 304). Preferably, the data collection instructions are executable instructions designed to collect values of input parameters, values of output parameters, and/or subroutine calling sequences associated with one or more subroutines of the received integrated software. An example of a subroutine before data collection instructions are inserted is illustrated in FIG. 4. The same subroutine after data collection instructions are inserted is illustrated in FIG. 5.

The data collection instructions may be designed to collect input/output information for an "outer" subroutine, for "internal" subroutines called by the outer subroutine, and/or the contexts from which any of the subroutines are called. "Outer" subroutines call "internal" subroutines. Of course, a person of ordinary skill in the art will readily appreciate that all of the teachings described herein apply to any number of subroutine nesting levels. Accordingly, a subroutine may be both "internal" relative to one subroutine and "outer" relative to another subroutine. For example, if subroutine A calls subroutine B which, in turn, call subroutine C. Subroutine B is "internal" to A, and subroutine B is an "outer" subroutine to C.

Some input parameters may be parameters passed to the outer subroutine as part of a call to the outer subroutine. Other input parameters may be external variables used by the outer subroutine. Still other input parameters may be parameters returned to the outer subroutine in response to a call to an internal subroutine made by the outer subroutine. Similarly, some output parameters may be parameters returned by the outer subroutine in response to a call to the outer subroutine. Other output parameters may be external variables updated by the outer subroutine. Still other output parameters may be parameters passed to an internal subroutine called by the outer subroutine. Since an internal subroutine may be called from different places in different outer subroutines, the "context" from which the internal subroutine is called includes the name of the calling subroutine (i.e., the name of the outer subroutine), the calling statement number and other information.

Once the data collection instructions for the integrated software are generated and inserted, the integrated software and the data collection instructions are executed (step 306). During execution, the data collection instructions record the values of the input parameters passed to subroutines in the integrated software, output parameters passed from subroutines in the integrated software, and/or the subroutine calling sequences made within the integrated software (step 307). An example of a data structure used to store collected test data is illustrated in FIG. 6.

Subsequently, a programmer may modify one of the subroutines in the integrated software (e.g., the first version of the particular subroutine used for discussion herein) to create a modified version of the particular subroutine (e.g., a second version). The modification(s) may be to the body of the outer subroutine, the body of one or more internal subroutines, and/or one or more subroutine interfaces. The modification(s) may be required to add functionality to one or more subroutines in the integrated software, reduce the size of a subroutine, increase the speed of a subroutine, correct defects in a subroutine, and/or for any other reason. The second version of the particular subroutine is then sent to the computing device 100, 200 for unit testing (step 308). Again, subroutines may be received by the computing device 100, 200 in any well known manner. As is well known by persons of ordinary skill in the art, unit testing is testing of the particular subroutine "by itself" (i.e., without all of the other subroutines in the integrated software).

Figure 7:
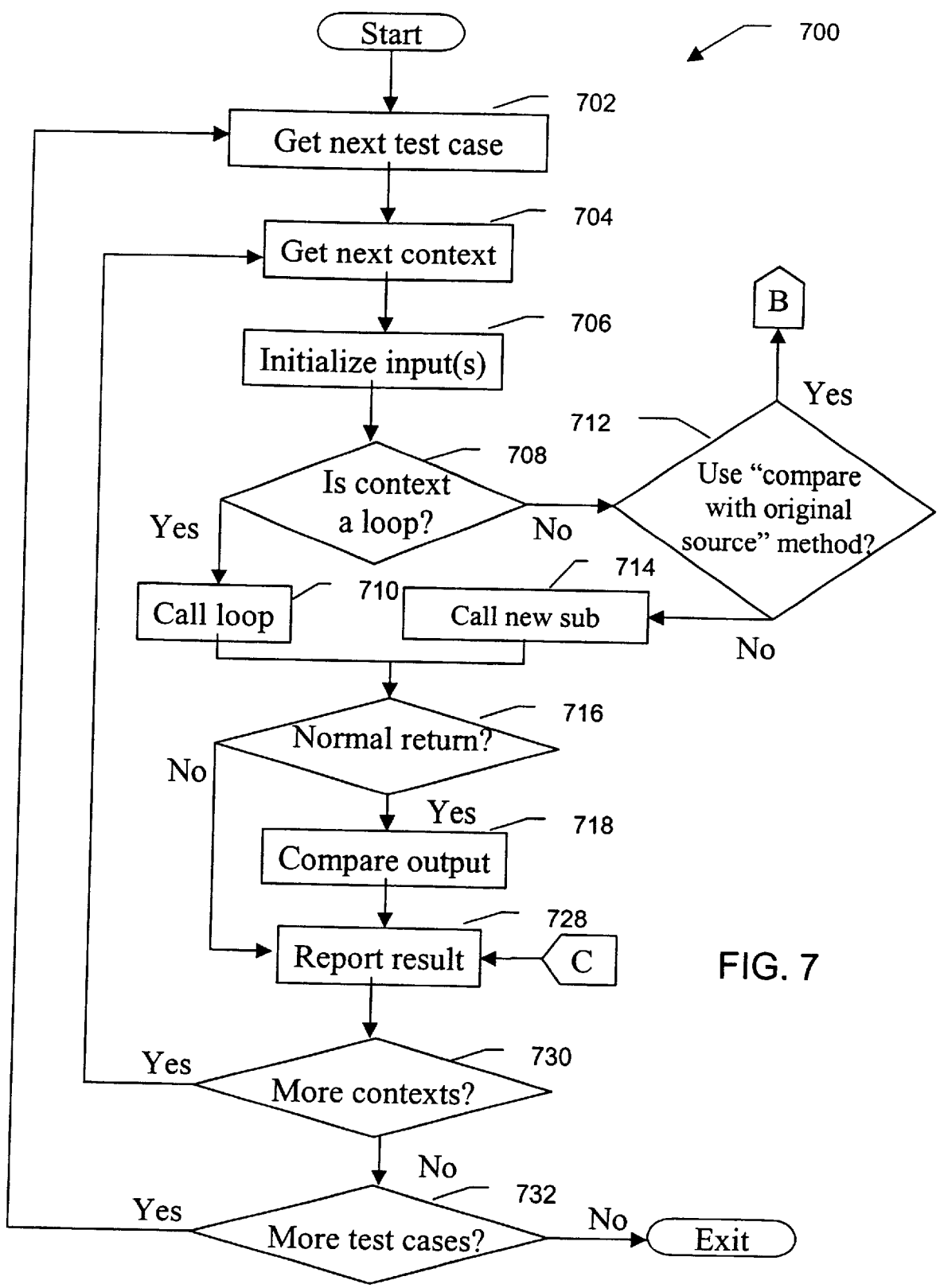
FIG. 7 is a flowchart of an exemplary test driver program.
Figure 7:
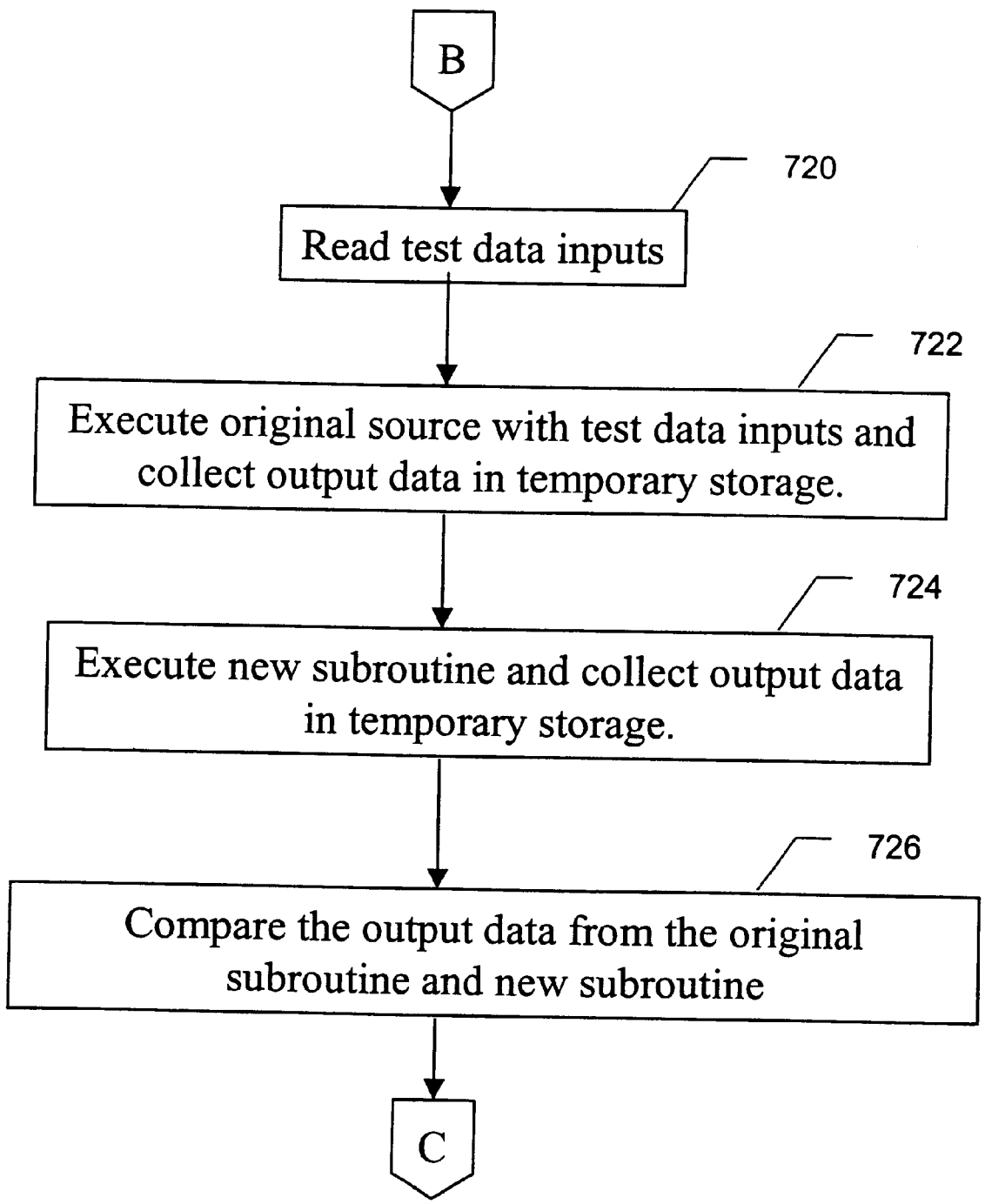
Figure 10:
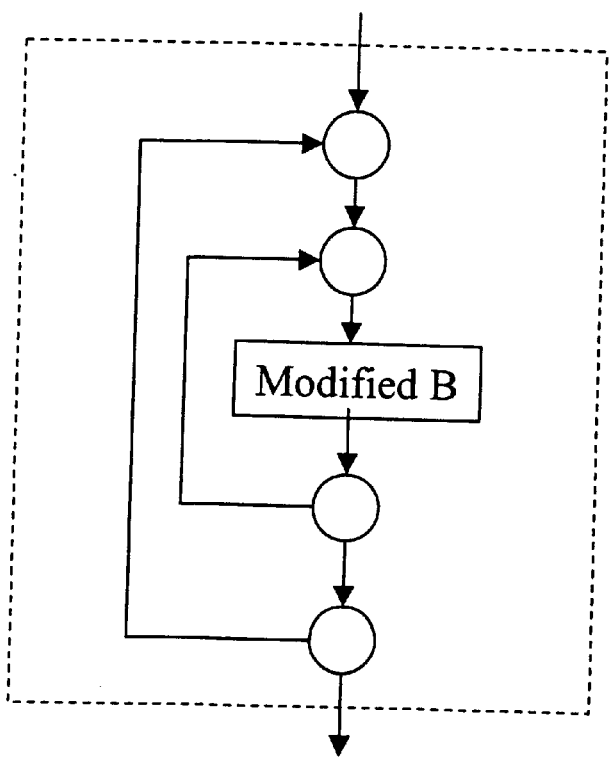
FIG. 10 is a flow diagram illustrating one way a subroutine may be called from within a loop.
Figure 11:
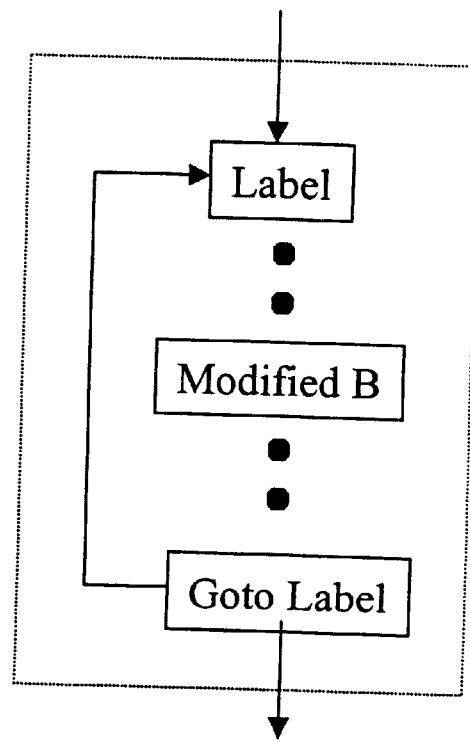
FIG. 11 is a flow diagram illustrating another way a subroutine may be called from within a loop.
Figure 12:
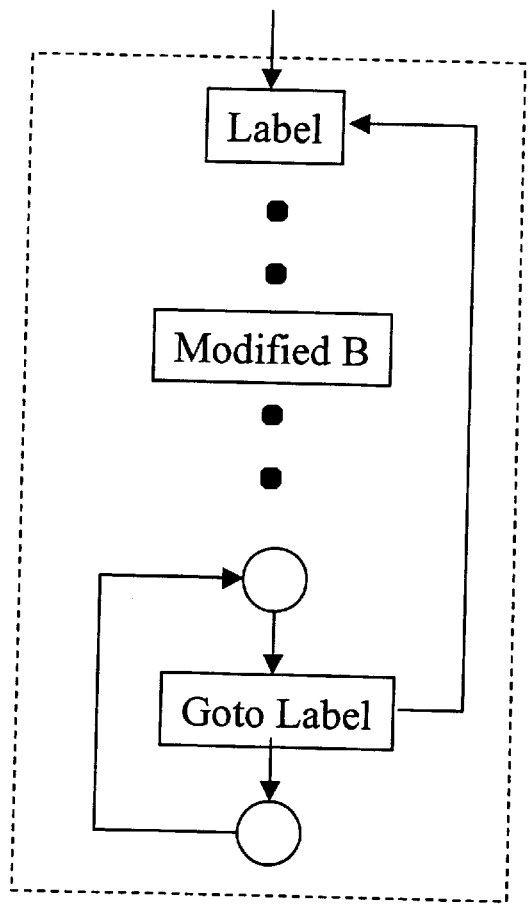
FIG. 12 is a flow diagram illustrating yet another way a subroutine may be called from within a loop.
Figure 13:
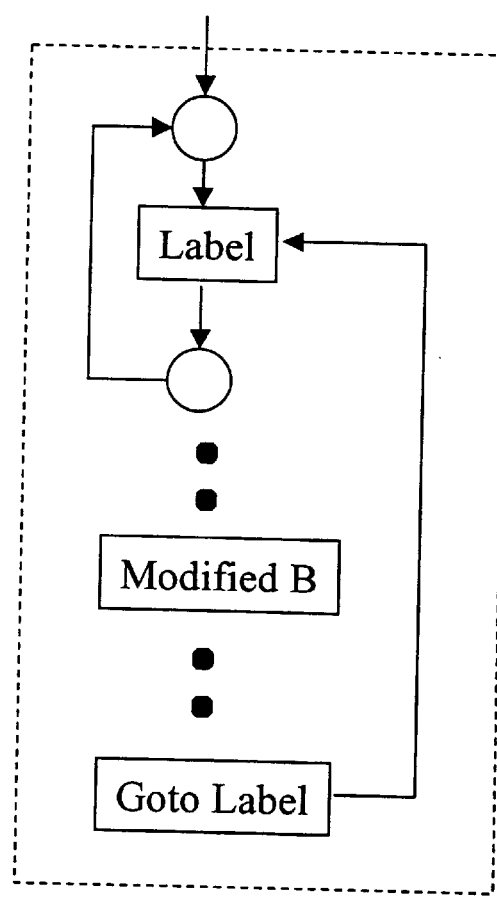
FIG. 13 is a flow diagram illustrating still another way a subroutine may be called from within a loop.
Figure 16:
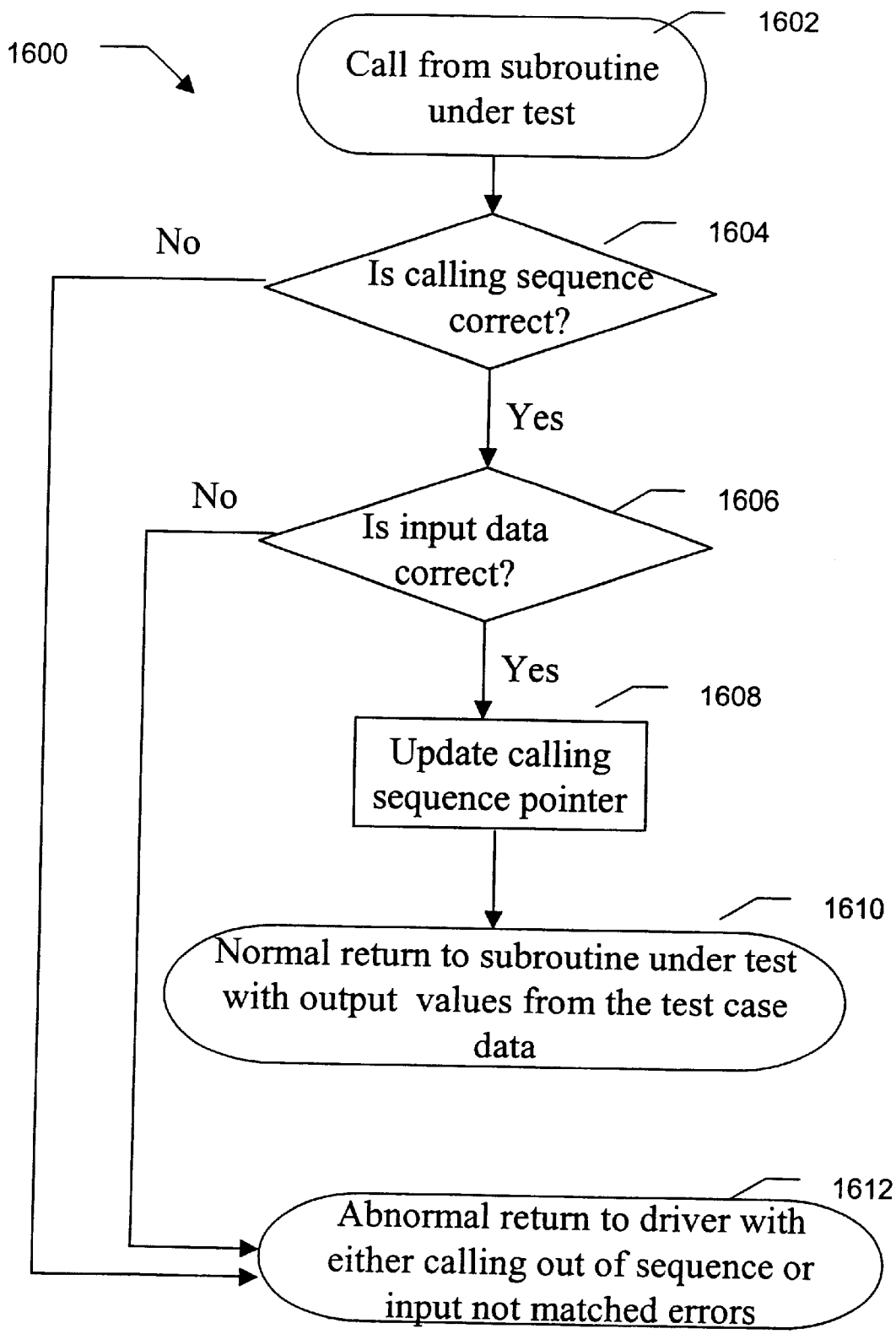
FIG. 16 is a flowchart of an exemplary stub program.

Once the second version of the particular subroutine is submitted to the computing device 100, 200, the computing device 100, 200 automatically generates driver and stub software for the subroutine in order to facilitate unit testing of the subroutine (step 310). Preferably, the driver/stub software is designed to stimulate the second version of subroutine using the values of the input parameters recorded during execution of the integrated software. In addition, the driver/stub software is preferably designed to collect the output parameters and/or subroutine calling sequences generated by the second version of the subroutine when it is executed using those input parameters. As described above, output parameters may be parameters returned from the second version of the subroutine, external variables, and/or parameters passed to a called subroutine by the second version of the subroutine. A flowchart illustrating an exemplary driver program is illustrated in FIG. 7 and is described in more detail below. A flowchart illustrating an exemplary stub program is illustrated in FIG. 16 and is described in more detail below.

Once the driver/stub software for the second version of the subroutine is generated, the second version of the subroutine and the driver/stub software are executed (step 312). During execution, the driver/stub software records the values of the output parameters passed from the second version of the subroutine and the calling sequence made by the second version of the subroutine (step 314). An example of a data structure used to store collected test data is illustrated in FIG. 6.

The computing device 100, 200 then compares the values of the recorded outputs received during the execution of the first version of the subroutine with the values of the output parameters received during the execution of the second version of the subroutine (step 316). If the values of the output parameters received from the first version of the subroutine match the values of the output parameters received from the second version of the subroutine (step 318), the computing device 100, 200 compares the subroutine calling sequence made by the first version of the subroutine with the subroutine calling sequence made by the second version of the subroutine (step 320).

If the first calling sequence matches the second calling sequence (step 322), and the values of the output parameters received from the first version match the values of the output parameters received from the second version, the computing device 100, 200 preferably displays a message to the user that the second version of the subroutine passed the integration test (step 324). If the values of the output parameters received from the first version do not match the values of the output parameters received from the second version, the computing device 100, 200 preferably displays a message to the user that the second version of the subroutine failed the integration test due to an interface error (step 326). If the first calling sequence does not match the second calling sequence, the computing device 100, 200 preferably displays a message to the user that the second version of the subroutine failed the integration test due to a sequence error (step 328). Although the process 300 illustrated here exits when one error is detected (e.g., an interface or calling sequence error), a person of ordinary skill in the art will readily appreciate that the testing may continue to determine if other portions of the test pass or fail (e.g., subroutine calling sequence).

A more detailed flowchart of exemplary driver process 700 is illustrated in FIG. 7. Preferably, the driver process 700 is embodied in a software program which is stored in the computing device memory 108 and executed by the computing device CPU 104 in a well known manner. However, some or all of the steps of the driver process 700 may be performed manually and/or by another device. Although the driver process 700 is described with reference to the flowchart illustrated in FIG. 7, a person of ordinary skill in the art will readily appreciate that many other methods of performing the acts associated with driver process 700 may be used. For example, the order of many of the steps may be changed without departing from the scope or spirit of the present invention. In addition, many of the steps described are optional.

Generally, the driver process 700 calls the second version of the subroutine. As part of the second subroutine call, the driver process 700 passes previously collected test data as inputs to the second version subroutine. Importantly, the test data passed is recorded during integration testing using the first version of the subroutine. The stubs collect the generated outputs from the second version of the subroutine and compare the generated outputs with the expected return values recorded during integration testing with the first version of the subroutine.

Several alternative embodiments may reduce the amount of potentially unbounded unit regression test data and/or allow programmers to change the interface between two subroutines. In a first embodiment, if the subroutine under test is called from within a loop, the loop is modified to be a substitute for the subroutine under test. An example of a subroutine called from within a loop is illustrated in FIG. 8. The code from FIG. 8, modified to treat the loop as a substitute for the subroutine under test, is illustrated in FIG. 9. Accordingly, the driver for the subroutine under test will call the loop when the system test case is exercised in testing instead of directly calling the subroutine under test. FIGS. 10–13 illustrate different ways a subroutine may be called from a loop in most modern high level programming languages. Compiler parsers can recognize these scenarios in a well known manner.

In a second embodiment, the driver may be constructed in such a way that the subroutine under test is executed substantially concurrent with a previous version of the same subroutine. In such an instance, the results of the execution of both subroutines is compared to ensure that previous passed tests are not compromised by the modified subroutine. Code modified to facilitate this embodiment is illustrated in FIG. 14.

In a third embodiment, code may be inserted to selectively collect test data from a loop according to some predefined criteria, such as path convergence and/or boundary conditions. The predefined criteria can be defined in terms of variables used in the subroutine under test. For example, "when I=1, or N" or when "some condition" becomes true. Alternately, the predefined criteria can be defined according to conditions outside of the variables used in the subroutine under test. For example, the number of times a subroutine has been called may be used. Code modified to facilitate this embodiment is illustrated in FIG. 15. Of course, a person of ordinary skill in the art will readily appreciate that one or more of these methods may be used in combination as is described below.

The driver process 700 begins when the computing device 100, 200 retrieves a first test case (step 702) and a first context (step 704) from memory 108 or a separate database. An example of a data structure used to store test data is illustrated in FIG. 6. Based on the retrieved test data, the computing device 100, 200 initializes one or more inputs to the subroutine being tested (step 706). If the context is a loop (step 708), the computing device 100, 200 calls the modified loop (step 710). If the context is not a loop, and no designation is included in the test data that the subroutine under test should be executed substantially concurrent with a previous version of the same subroutine (step 712), the computing device 100, 200 calls the subroutine under test (i.e., the new version of the subroutine) (step 714). In either event (loop containing subroutine or subroutine called directly), the computing device 100, 200 determines if the call returned normally by checking for predetermined exceptions in well known manner (step 716). If the call did return normally, the computing device 100, 200 compares the output(s) generated by the subroutine under test with the output(s) previously recorded (step 718).

If a designation is included in the test data that the subroutine under test should be executed substantially concurrent with a previous version of the same subroutine (step 712), the computing device 100, 200 reads the test data (step 720) and executes the previous version of the subroutine using the recorded test data inputs in order to collect a first set of output data generated by the previous version of the subroutine (step 722). Subsequently, the computing device 100, 200 executes the version of the subroutine under test using the recorded test data inputs and collects a second set of output data generated by this version of the subroutine (step 724). The two sets of output data are then compared (step 726).

Eventually, under any of the three scenarios (subroutine, loop, or concurrent), the computing device 100, 200 reports the results (step 728). Preferably, the computing device 100, 200 displays a message to the user that the subroutine passed the test, failed the test due to an interface error, or failed the test due to a sequence error. If more contexts (step 730) or more test cases (step 732) exist, the process 700 preferably repeats.

A more detailed flowchart of an exemplary stub process 1600 is illustrated in FIG. 16. Preferably, the process 1600 is embodied in a software program which is stored in the computing device memory 108 and executed by the computing device CPU 104 in a well known manner. However, some or all of the steps of the process 1600 may be performed manually and/or by another device. Although the process 1600 is described with reference to the flowchart illustrated in FIG. 16, a person of ordinary skill in the art will readily appreciate that many other methods of performing the acts associated with process 1600 may be used. For example, the order of many of the steps may be changed without departing from the scope or spirit of the present invention. In addition, many of the steps described are optional.

Generally, the stub process 1600 determines if the correct internal subroutine is being called by the subroutine under test and if the correct parameters are being passed from the subroutine under test to the stub. If everything is correct, the stub returns the values recorded during integration testing with a previous version of the subroutine (e.g., test passed, so fake the subroutine into thinking it got what it wanted). If an error occurs in the calling sequence or the data passed, the stub returns an indication of the error.

The stub process 1600 begins when the subroutine under test calls an internal subroutine (step 1602). Instead of the actual internal subroutine being executed, the stub process 1600 is executed. This stub process 1600 causes the computing device 100, 200 to determine if the subroutine calling sequence is correct (so far) by checking a string of expected subroutine calls recorded during integration testing (step 1604). Preferably, a pointer into the string is used to keep track of the current location in the expected calling sequence. If the pointer is pointing to the subroutine for which this stub is "standing in" (i.e., the internal subroutine just called), the calling sequence is correct (so far).

If the calling sequence is correct (so far), the stub process 1600 causes the computing device 100, 200 to determine if the data being passed to the stub by the subroutine under test matches the data passed by the previous version of the subroutine during integration testing (step 1606). If the data being passed to the stub is correct, the stub process 1600 causes the computing device 100, 200 to update the calling sequence pointer (step 1608) and return normally to the subroutine under test with the corresponding return values recorded during integration testing (step 1610). If the calling sequence or the input data are incorrect, the stub process 1600 causes the computing device 100, 200 to return abnormally to the driver with an indication of the error (e.g., calling sequence or interface error). Preferably, an abnormal return is achieved by throwing an exception only handled by the driver.

During the course of development, a programmer may want to change the interface between two subroutines, for example to shift functionality from one subroutine to another. This kind of interface change is undesirable during later stages of development, especially after a code freeze. However, at other times, the programmer may desire the flexibility to restructure the interface among subroutines. This problem is further complicated by the fact that two different programmers may develop the two subroutines separately.

In other words, in the course of development, programmers may separately change the interfaces among a set of subroutines. This includes deletion of existing subroutines and addition of new subroutines. In order to prevent these changes from invalidating previously passed integration tests, a test workspace may be used. In a preferred embodiment, testing is conducted in three sets of workspaces: unit test workspaces, incremental integration workspaces and system integration workspace. An implementation of a workspace may be a directory of a file system.

The software project may have a set of modified subroutines, including new or deleted subroutines. Preferably, each of these subroutines has a unit test workspace where a programmer may modify and test the subroutine. A deleted subroutine does not have a unit test workspace. Of course, all subroutines that call a deleted subroutine should be modified to eliminate the call.

An incremental integration workspace is a workspace where a group of modified subroutines are tested together. Two subroutines A and B "interface" with each other if and only if (1) A calls B, or (2) if A transitively calls B and an external variable updated by A is read by B and the variable is not updated by any subroutine called between A and B. If these two subroutines are modified, they are integrated in the incremental integration workspace. In addition to the above workspaces, there is preferably one system integration workspace where all the subroutines belonging to the software product are built and tested as a system.

Preferably, the programmer first tests a modified subroutine in a unit test workspace. If the subroutine passes all unit test cases, and the subroutine does not interface with any modified subroutine, the programmer can submit the subroutine to the system integration workspace. Otherwise, the subroutine is submitted to the incremental integration workspace (e.g., there was an interface change that affected this subroutine).

New subroutines must pass new functionality testing, but new subroutines do not have any unit regression test cases. Accordingly, if a new subroutine does not interface with another modified subroutine, the programmer can submit the new subroutine to the system integration workspace. However, if a new subroutine does interface with another modified subroutine, the new subroutine is submitted to the incremental integration workspace. Notably, any existing subroutine that calls a new subroutine must be a modified subroutine.

If a subroutine fails a unit regression test case, there are two possibilities: (1) the subroutine interfaces incorrectly with another subroutine that calls it or is called by it, or (2) the subroutine does not call other subroutines in the correct sequence. In the first case, where the interface with another subroutine fails, there are two additional sub-cases to consider. First, the other subroutine, with which the subject subroutine fails the interface test, is not in a list of modified subroutines. Second, the other subroutine is in the list of modified subroutines.

In the first sub-case, since the other subroutine is not a modified subroutine, the programmer needs to correct the subject subroutine so that it will pass the test. Eventually, only interface errors with other modified subroutines, including new or deleted subroutines, remain, if any. In the second case of calling sequence errors, if none of the called subroutines have been modified, the calling subroutine is most likely in error and must be corrected. Eventually, only calling sequence errors remain if at least one of the called subroutine is in the list of modified subroutines, including new or deleted subroutines, if any. The subject subroutine may then be put into its incremental integration workspace.

At this stage, errors that are detectable in the unit test workspace have preferably been corrected. Some subroutines submitted to the incremental workspace may carry failed unit regression tests. Some subroutines submitted to the incremental workspace may indicate errors, while other subroutines submitted to the incremental workspace include desired interface changes. These errors must be resolved at the incremental integration stage.

All subroutines in an incremental integration workspace are preferably in the list of modified subroutines. Each of these subroutines preferably interfaces with at least one other subroutine in the incremental integration workspace with respect to some system test case. Each subroutine may have passed part or all of its unit regression tests.

Figure 17:
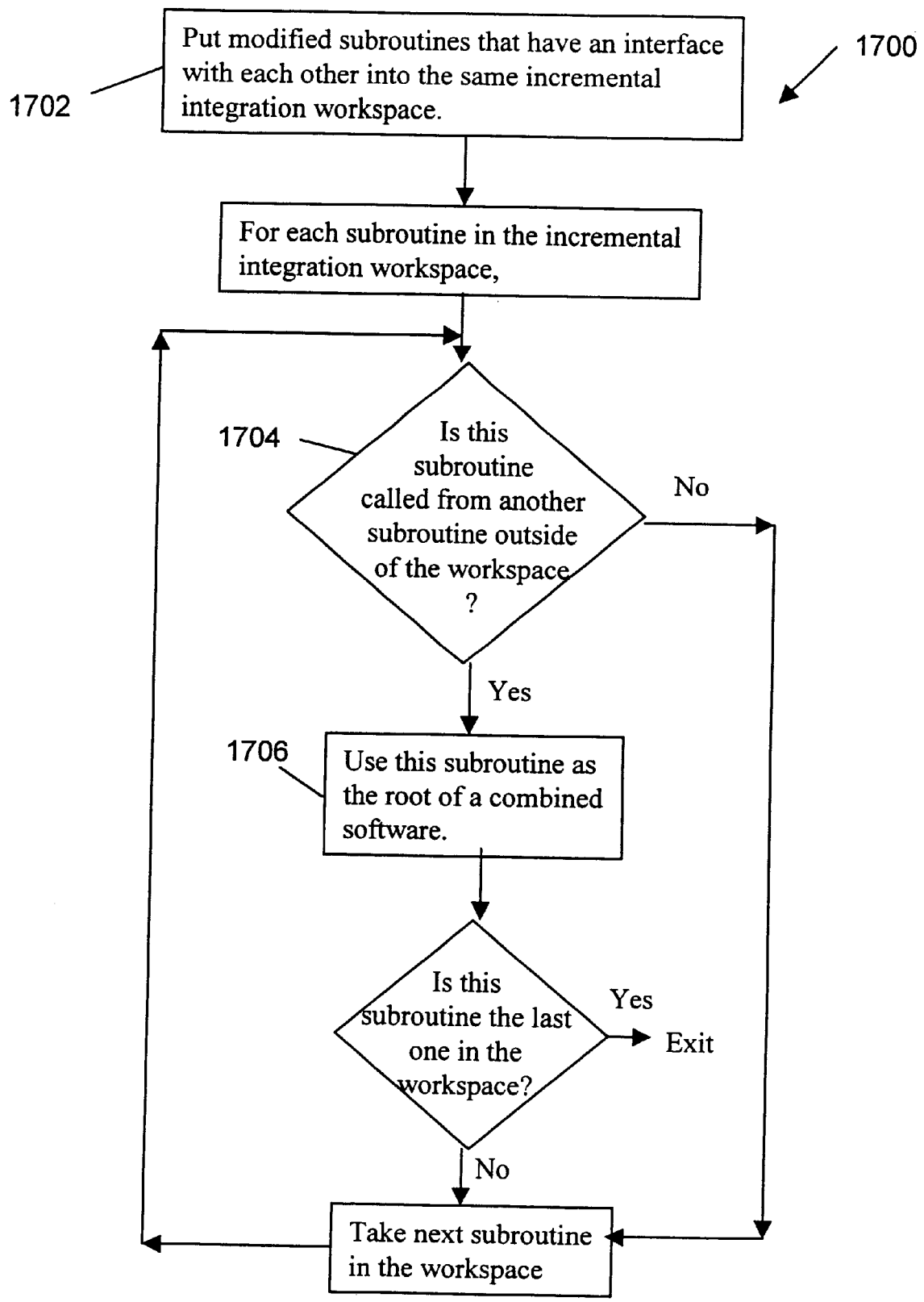
FIG. 17 is a flowchart of an exemplary process for determining the root of an integrated software.
Figure 18:
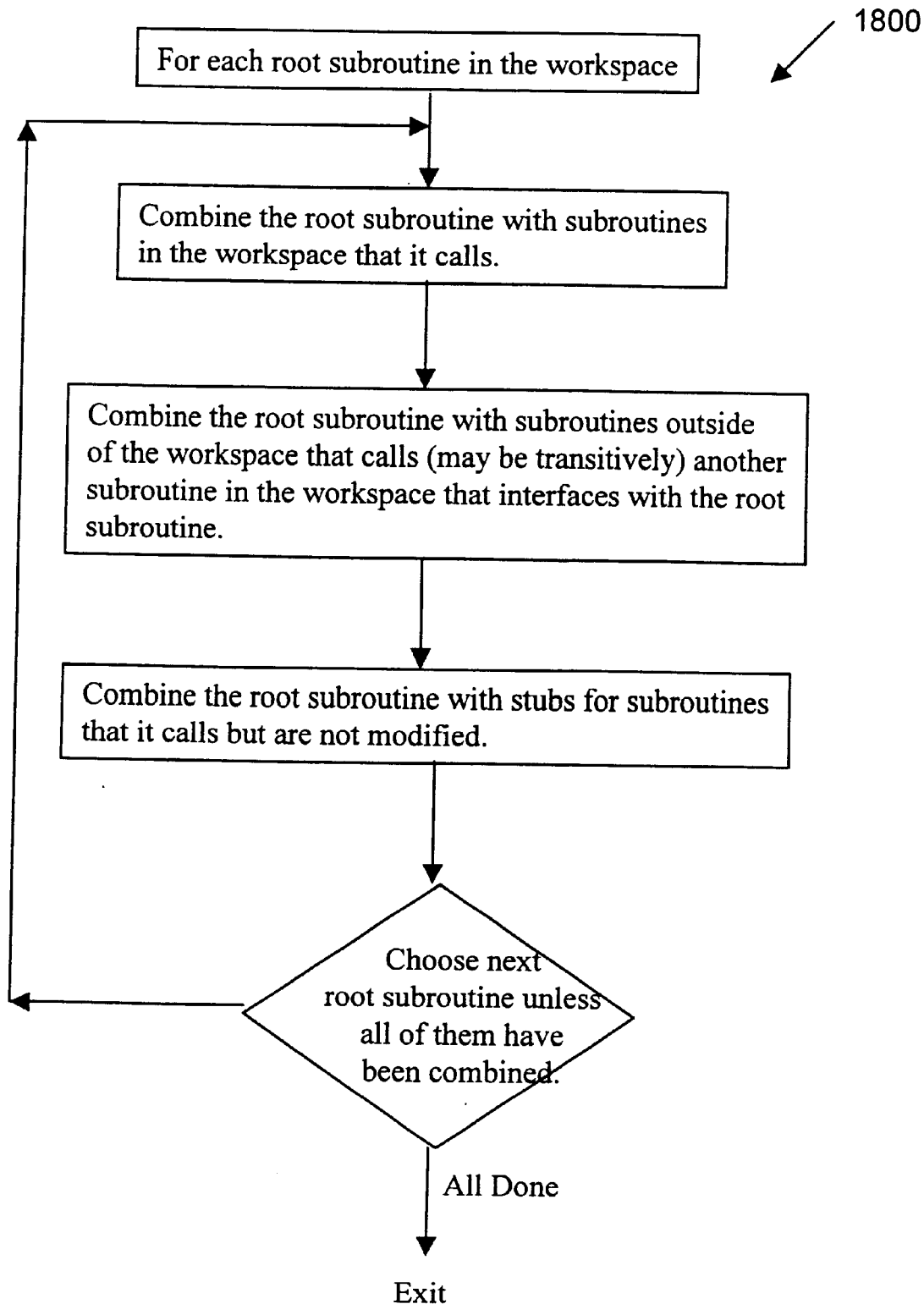
FIG. 18 is a flowchart of an exemplary process for combing subroutines into an integrated software.

The problem of incremental integration testing is solved by (1) combining subroutines so that they will be tested together, (2) determining the necessary test cases to exercise the combined integrated software, and (3) identifying and enforcing test criteria, such that previously passed integration test cases are not invalidated. A flowchart of an exemplary process 1700 for determining the root of an integrated software is illustrated in FIG. 17. A flowchart of an exemplary process 1800 for combing subroutines into an integrated software is illustrated in FIG. 18.

When a subroutine (e.g. subroutine A) is submitted into the incremental integration workspace (step 1702), the method examines subroutine A's unit regression test cases. If there exist unit regression test cases where subroutine A is called from a subroutine outside of the incremental integration workspace (step 1704), subroutine A will become the root of an incrementally integrated software (step 1706). The set of unit regression test cases in which A is called outside of the incremental integration workspace will become the test cases for the integrated software.

The incrementally integrated software is formed by compiling subroutine A with an automatically generated driver, modified subroutines in the same incremental integration workspace that are directly or transitively called by subroutine A, and the stubs or actual subroutines outside of the incremental integration workspace that are called by subroutines in the incrementally integrated software. The incrementally integrated software can be formed incrementally as subroutines are submitted to the incremental integration workspace. Once all the modified subroutines belonging to an integrated software have been submitted, the testing of the integrated software can automatically begin. (See FIG. 18).

Figure 19:
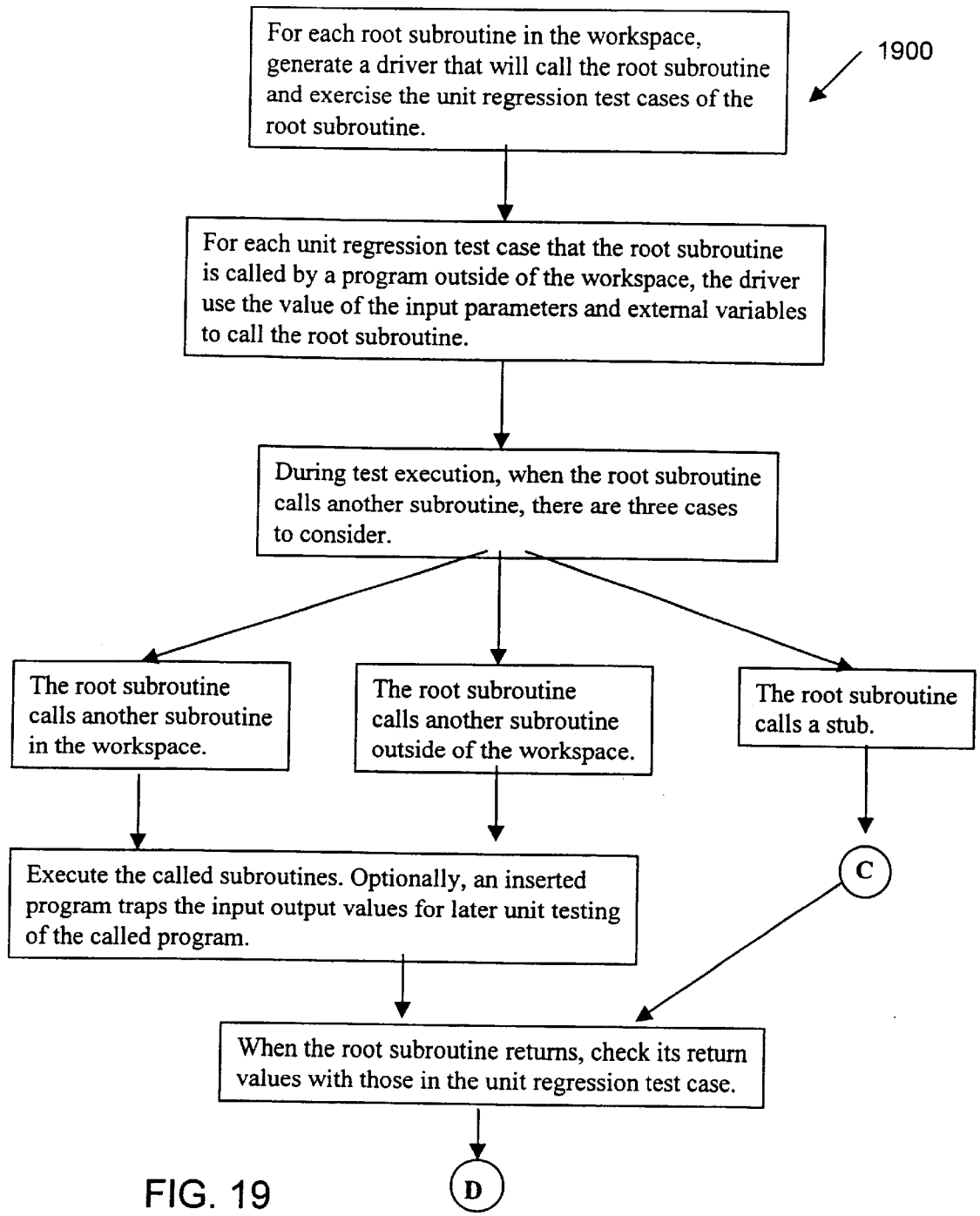
FIGS. 19–21 are a flowchart of an exemplary process for testing an integrated software.
Figure 20:
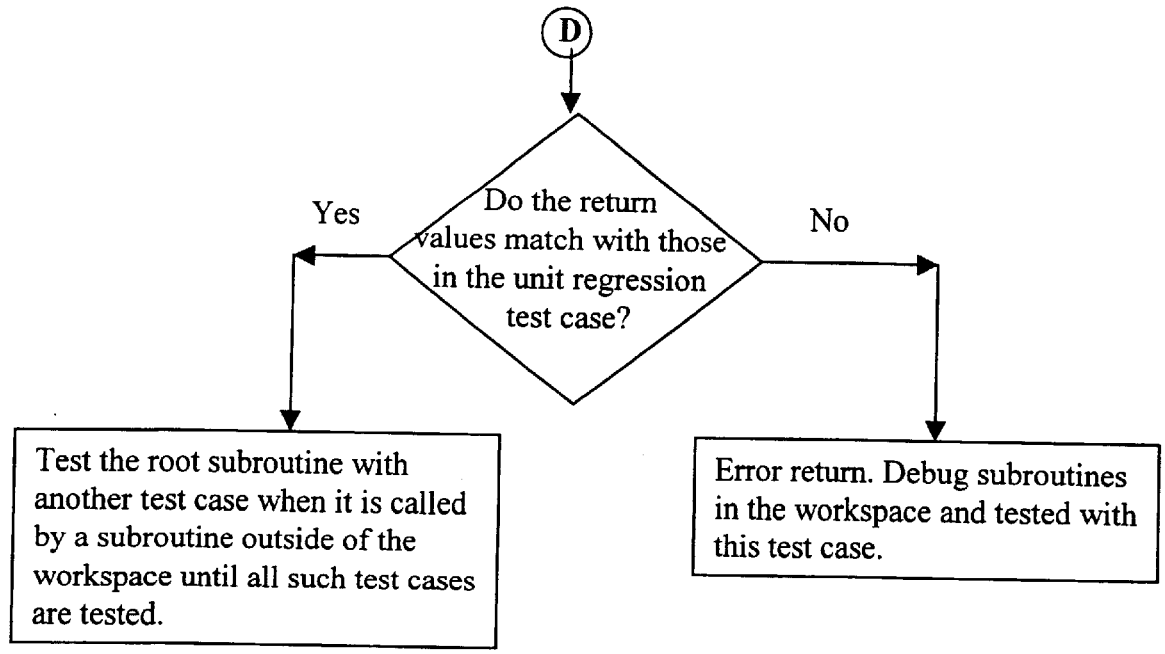
Figure 21:
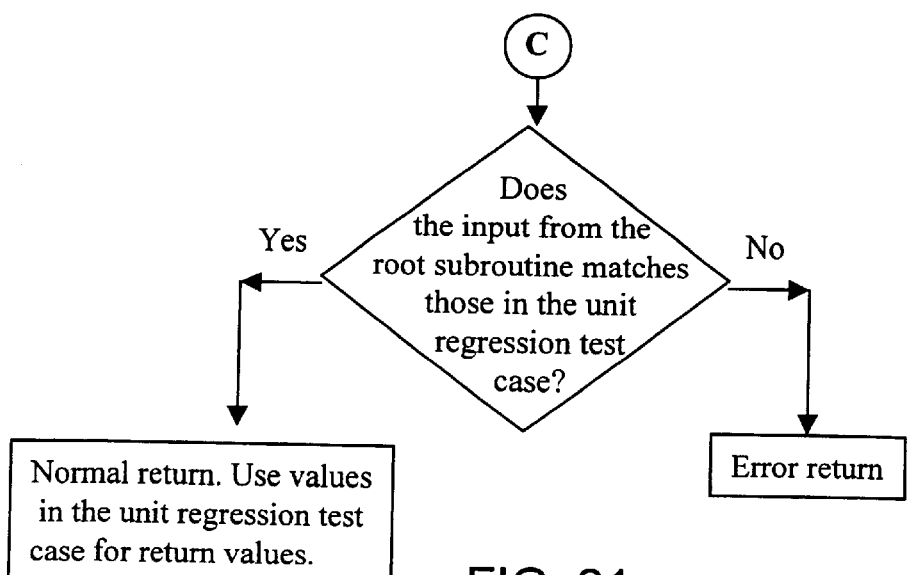
Figure 22:
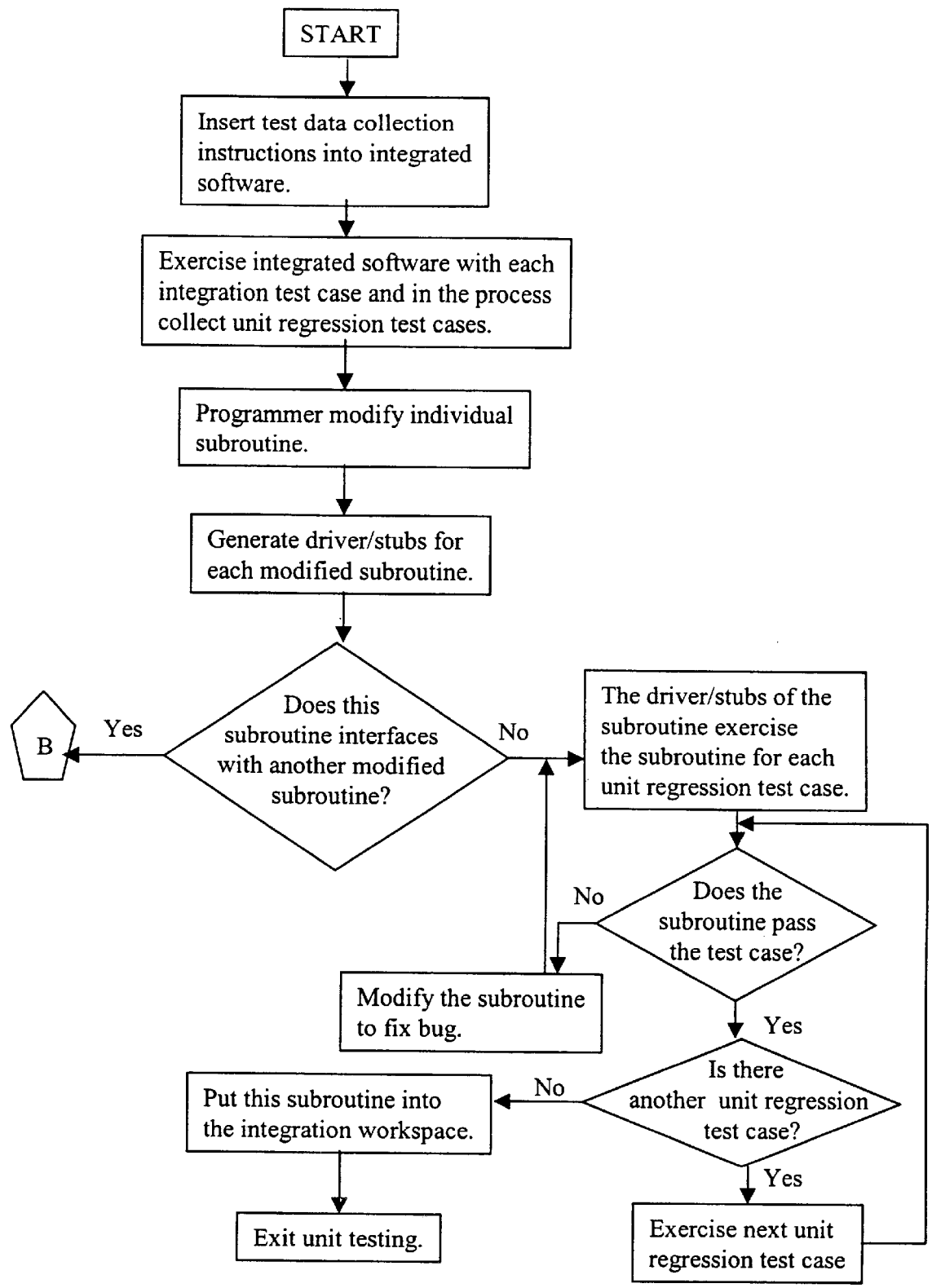
FIGS. 22–25 are a flowchart of an exemplary process for testing software.
Figure 23:
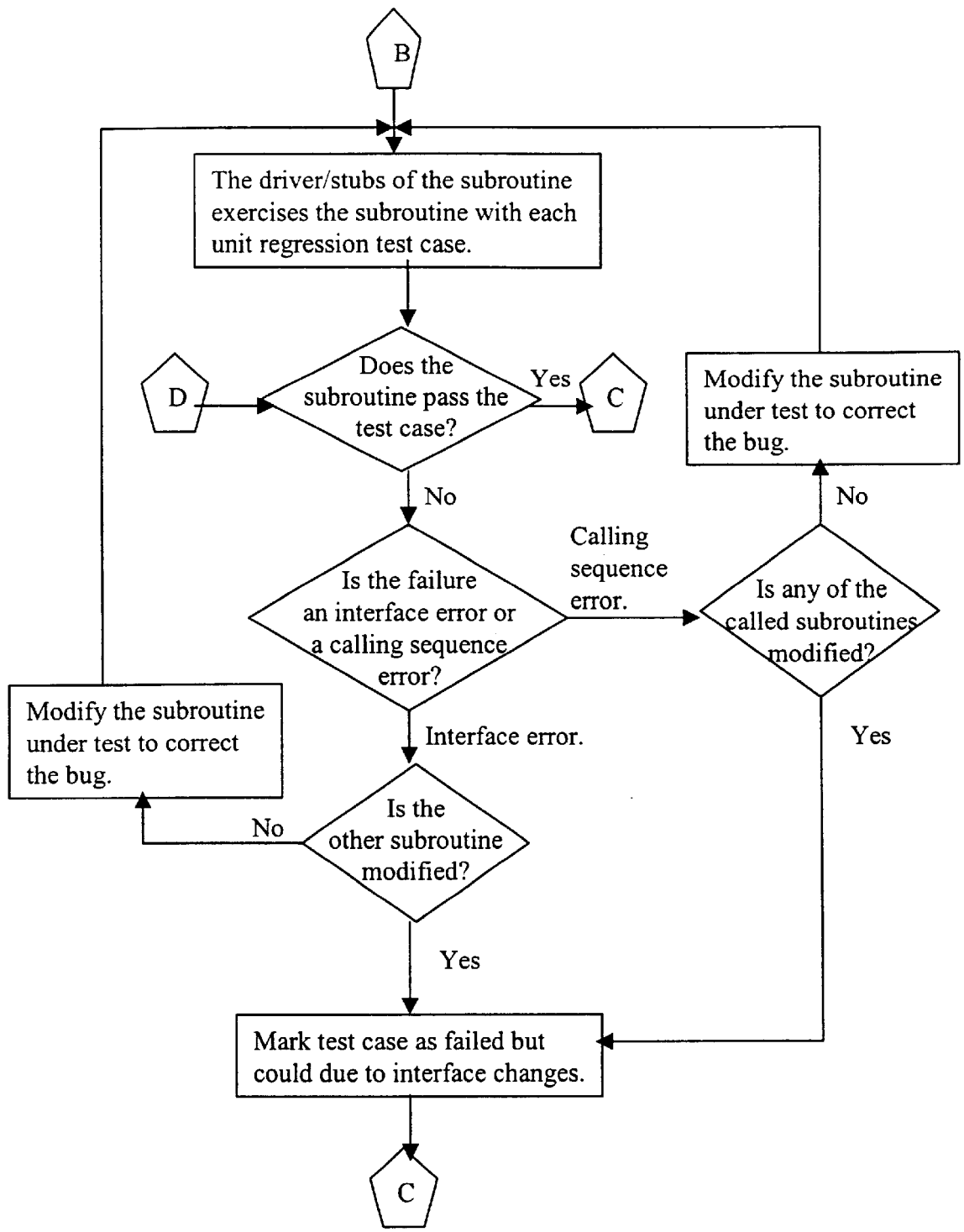
Figure 24:
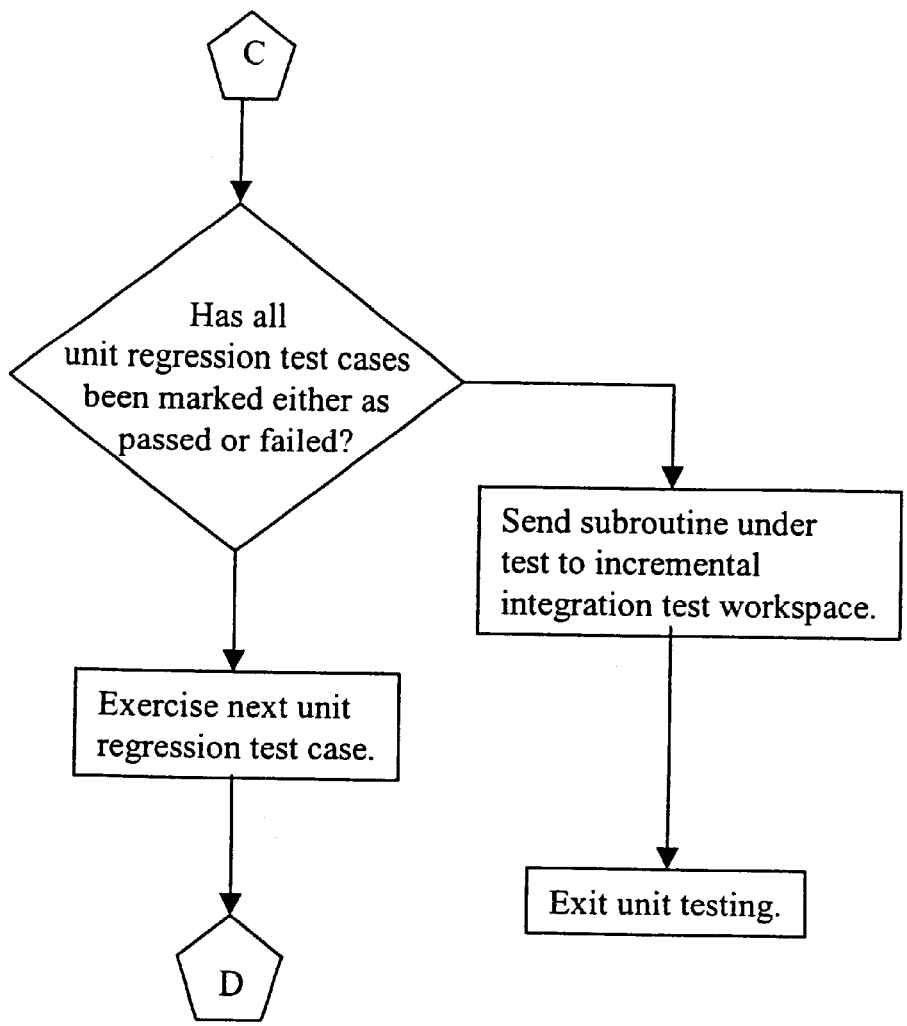
Figure 25:
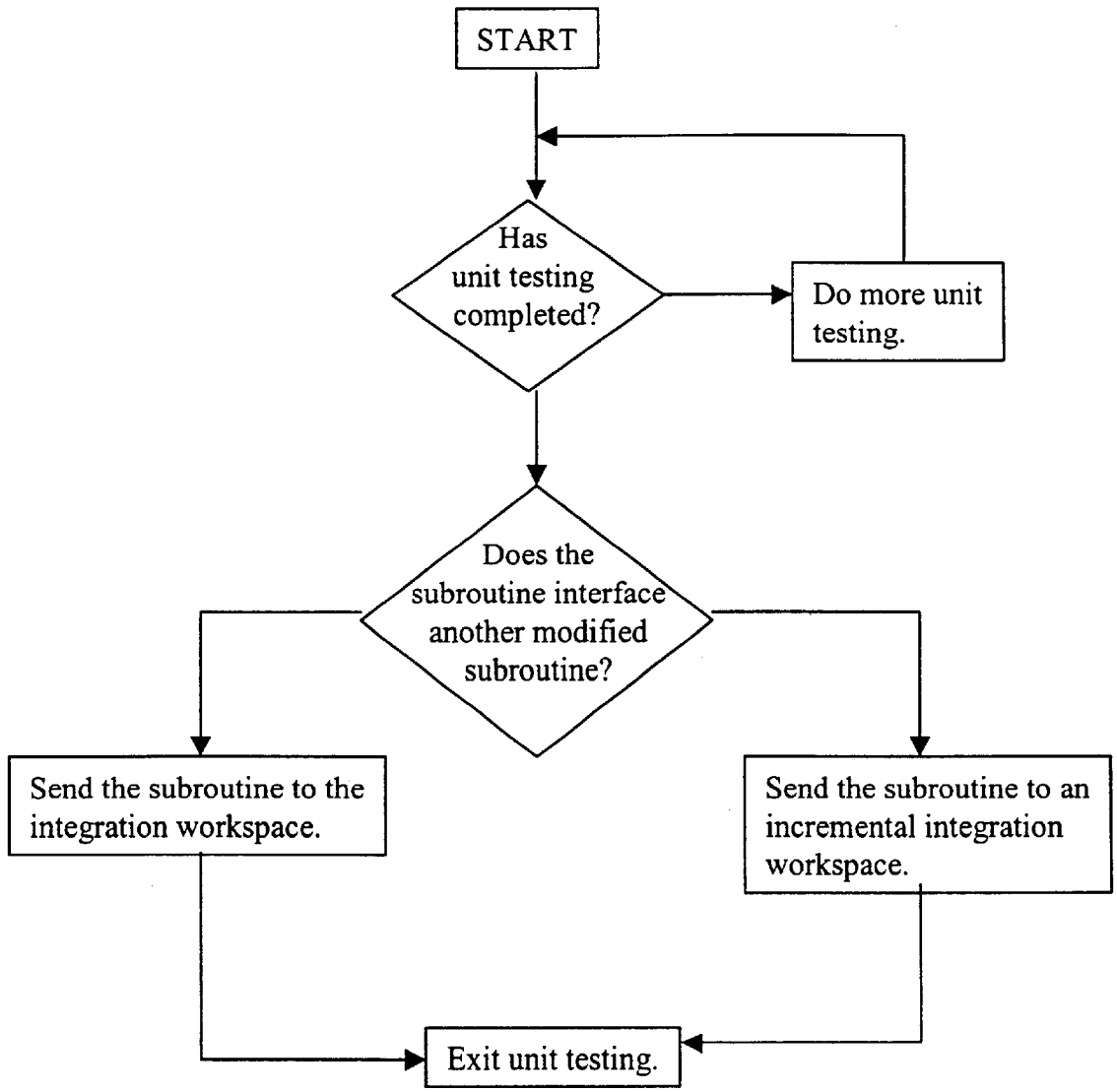

A flowchart of an exemplary process 1900 for testing an integrated software is illustrated in FIGS. 19–21. The driver may exercise the integrated software test cases one at a time using the inputs from the unit regression test data of subroutine A. Each time subroutine A returns, the driver preferably checks the return values from subroutine A against the expected values of the test case in the test data. If the values do not match, the error must be corrected (i.e., checkpoint 1).

If all the subroutines invoked by an incrementally integrated software pass their respective unit regression tests, then the corresponding incremental integration tests do not need to be exercised. These cases and their corresponding integration test cases are marked as passed. During testing, when subroutine A calls the stub of a subroutine outside of the incremental integration workspace, the stub may check for the input values passed from subroutine A to the stub against the expected values from the test case and return the expected value from the test case. The stub may also check the calling sequence of the subroutine with respect to other unmodified subroutines. If there is a mismatch, the error must be corrected (i.e., checkpoint 2).

When subroutine A calls a modified subroutine (e.g., subroutine B), there may or may not be a corresponding unit regression test case for subroutine B. By using the code insertion method, a program can be inserted between subroutine A and subroutine B such that when subroutine A calls subroutine B, the inserted program will be called first. The inserted program can check whether the input values from subroutine A to subroutine B are as expected if subroutine B has a corresponding unit regression test case (i.e., checkpoint 3). If subroutine B does not have a corresponding unit regression test case, the inserted program preferably records this fact. In any event, the inserted code may pass the input values to subroutine B to continue the execution.

Subroutine B may in turn call yet another modified subroutine (e.g., subroutine C). In such an instance, the interface checking is treated the same way as when subroutine A calls subroutine B. When subroutine B calls a stub, there are two cases to consider: (1) subroutine B has a corresponding test case and (2) subroutine B does not have a corresponding test case. In case (1), the stub may check for the input values that subroutine B is passing to the stub against the values recorded in the test case. If the input values match, the stub may return the corresponding output values according to the test data, otherwise an error is recorded (i.e., checkpoint 4). In case (2), the stub may link to the actual subroutine, and the input and output values may be recorded (i.e., checkpoint 5).

If after execution of the test case, all checkpoints passed, the test case may be marked as passed. If either of checkpoints 1 and 2 do not pass, the error is preferably corrected, and the test is rerun. If both checkpoint 1 and checkpoint 2 pass, the test case may pass after review by programmers. Once a test case has been marked as passed, the data recorded in checkpoints 3, 4 and 5 may be used as test case data for future use. When all the test cases for the integrated software pass, all the subroutines in the incremental integration workspace may be submitted to the system integration workspace.

In the system integration workspace, all previously passed system tests (unless deemed obsolete) should continue to work. Accordingly, system testing may concentrate on new functionality. The unit regression test cases for each passed functional test case may be stored. When errors occur, the subroutines suspected of causing the errors may be returned to the unit test workspace and the previously described process may be repeated. Because previously passed test cases cannot be invalidated with this process, eventually all new functional tests will either pass or they will be deemed inapplicable. If the number of system test cases (either regression or functional) is finite, the system test process will converge using this method.

The methods described herein may also be used in other software applications. An Independent Unit of Change (IUC) is a group of modified subroutines that can be submitted (replacing their original version) to a system load without invalidating any system level regression tests. A Minimum Independent Unit of Change (MIUC) is an IUC that contains the smallest number of modified subroutines that can be submitted independently without invalidating any system level regression tests. A MIUC can be easily derived from the combined objects in the incremental workspace. A Scope of Change Index (SCI) of IUC or MIUC is the number of subroutines that are modified (relative to this submission). Scope of Change Index of a system load is the maximum of SCI for all MIUC included in the load.

One common measure of the amount of change is the number of subroutines that are modified in a load. Typically, the stability of a load decreases with increases in the number of subroutines that are changed, because the likelihood of invalidating system regression tests increases. The Scope of Change of a system load may be used as another measure of stability. Since the Scope of Change Index of an IUC or MIUC measures the number of subroutines that are impacted in a change, it is a good indicator of the complexity of changes included in the load.

While the number of changes may just reflect the productivity of programmers submitting changes, the Scope Change Index reflects the complexity of changes submitted. A software project manager can use this Scope of Change Index for the system load over time as a way of measuring the project's convergence to stability. After a load freeze, it is reasonable to restrict change units only to those with Scope of Change Index equal to 1, i.e. all changes are localized to a single subroutine. With this restriction, changes that invalidate regression tests can be easily backed out, or fixed.

The system test information may also be used during the requirements phase. Each system test can be linked to the elements of requirements that it covers. A complete coverage of all requirements requires that all elements of requirements should be linked to at least one system test. When elements of requirements are modified, the software tool can display the affected system tests to a programmer, requesting that these system tests be reviewed in case they need to be changed to reflect the requirements modification. All modified system tests for a particular release can be marked for further analysis during the design phase. In addition, the software tool can display the new elements of requirements that are not yet covered by the existing system tests. Any system tests that are not linked to a requirements element are obsolete and can be deleted.

The system test information may also be used during the design phase. Each system test can be linked to the code that it exercises. A complete coverage at the subroutine level requires that all subroutines be linked to at least one system test. During design, a programmer may decide to add new subroutines and/or modify existing subroutines. The software tool can identify all system tests that are impacted by the modified subroutines. This set can be compared to the set identified during the requirements phase. Any difference must be resolved by modifying the design and/or modifying the requirements.

These modifications may require further changes in the system tests. New system tests could be added if necessary to achieve complete coverage of all new or modified subroutines. Any system test that does not cover any subroutines should be examined to determine whether it is an obsolete test or if it shows gaps in the design.

The software tool may also keep track of all subroutines that call a particular subroutine. This information can help the designer to assess the impact due to a change in that subroutine B, since the designer has access to all the contexts in which that subroutine B will be called. As previously described, since system tests are closely checked with new requirements and design, they can be kept up-to-date to be consistent with the latest requirements and design. Furthermore, they can be checked for completeness, and obsoleteness.

In summary, persons of ordinary skill in the art will readily appreciate that methods and apparatus for preventing software modifications from invalidating previously passed test cases has been provided. Software developers employing the techniques described herein may benefit from faster and/or more thorough testing of software. In turn, such benefits may lead to decreased design cycles and/or more reliable software based systems.

The foregoing description has been presented for the purposes of illustration and description. It is not intended to be exhaustive or to limit the invention to the exemplary embodiments disclosed. Many modifications and variations are possible in light of the above teachings. The scope of this patent is not limited to this detailed description, but rather covers all examples falling within the claims appended hereto.

What is claimed is:

1. A method of preventing software modifications from invalidating previously passed integration tests, the method comprising the steps of:

receiving a first subroutine, a second subroutine, and a third subroutine at a computing device, the first subroutine being structured to call the second subroutine, the second subroutine being structured to call the third subroutine;

generating data collection instructions, the data collection instructions being structured to collect a first input value associated with the second subroutine, the data collection instructions being structured to collect a first output value associated with the second subroutine;

executing the first subroutine and the data collection instructions, the execution of the first subroutine causing the execution of the second subroutine, the execution of the second subroutine causing the execution of the third subroutine;

storing the first input value and the first output value collected by the data collection instructions in a memory device;

receiving a modified second subroutine at the computing device;

generating a driver to exercise the modified second subroutine using the first input value;

generating a stub to take the place of the third subroutine, the stub being structured to collect a second output value associated with the modified second subroutine;

executing the driver, the driver causing the execution of the modified second subroutine, the execution of the modified second subroutine causing the execution of the stub;

comparing the first output value associated with the second subroutine and the second output value associated with the modified second subroutine; and generating a user message on an output device, the user message indicating a test status based on the comparison.

2. A method as defined in claim 1, further comprising the step of collecting a second input value associated with the second subroutine, the second input value associated with the second subroutine comprising a parameter value passed from the third subroutine to the second subroutine, the first input value associated with the second subroutine comprising a parameter value passed from the first subroutine to the second subroutine, wherein the stub is structured to return the second input value associated with the second subroutine to the modified second subroutine if first output value associated with the second subroutine and the second output value associated with the modified second subroutine are equal.

3. A method as defined in claim 1, wherein the first input value associated with the second subroutine comprises a parameter passed to the second subroutine as part of a call to the second subroutine.

4. A method as defined in claim 1, wherein the first input value associated with the second subroutine comprises an external variable used by the second subroutine.

5. A method as defined in claim 1, wherein the first input value associated with the second subroutine comprises a parameter returned to the second subroutine in response to a subroutine call made by the second subroutine.

6. A method as defined in claim 1, wherein the first output value associated with the second subroutine comprises a parameter returned from the second subroutine in response to a call to the second subroutine.

7. A method as defined in claim 1, wherein the first output value associated with the second subroutine comprises an external variable used by the second subroutine.

8. A method as defined in claim 1, wherein the first output value associated with the second subroutine comprises a parameter passed by the second subroutine as part of a subroutine call made by the second subroutine.

9. A method as defined in claim 1, wherein the second output value associated with the modified second subroutine comprises a parameter returned from the modified second subroutine in response to a call to the modified second subroutine.

10. A method as defined in claim 1, wherein the second output value associated with the modified second subroutine comprises an external variable used by the modified second subroutine.

11. A method as defined in claim 1, wherein the second output value associated with the modified second subroutine comprises a parameter passed by the modified second subroutine as part of a subroutine call made by the modified second subroutine.

12. A method as defined in claim 1, further comprising the steps of:
recording a fist sequence of subroutine calls made by the second subroutine;
recording a second sequence of subroutine calls made by the modified second subroutine; and
comparing the first sequence of subroutine calls with the second sequence of subroutine calls.

13. A method as defined in claim 12, wherein the step of comparing the first sequence of subroutine calls with the second sequence of subroutine calls is caused by the stub.

14. A method as defined in claim 1, wherein the modified second subroutine has experienced an interface change relative to the second subroutine.

15. A method as defined in claim 1, wherein the modified second subroutine has experienced a body change relative to the second subroutine.

16. A method as defined in claim 1, wherein the step of comparing the first output value associated with the second subroutine and the second output value associated with the modified second subroutine is caused by the stub.

17. A method as defined in claim 1, wherein the step of generating a user message on an output device is caused by the stub.

18. A method as defined in claim 1, wherein the first subroutine, the second subroutine, the third subroutine, and the modified second subroutine are all different.

19. A method as defined in claim 1, further comprising the step of inserting test code for the second subroutine before and after a loop in the first subroutine, if the loop contains a call to the second subroutine.

20. A method as defined in claim 1, further comprising the step of bypassing at least one of the data collection instructions if a predefined logic test evaluates to true, the predefined logic test relying on the value of a variable used by the second subroutine.

21. A method as defined in claim 1, further comprising the step of bypassing the data collection instructions if the data collection instructions have been executed a predetermined number of times.

22. A method as defined in claim 1, further comprising the step of generating a unit test workspace, an incremental integration workspace, and a system integration workspace.

23. A method as defined in claim 22, wherein the incremental integration workspace contains a subset of modified subroutines being tested together.

24. A method of preventing software modifications from invalidating previously passed integration tests, the method comprising the steps of:
receiving a first subroutine and a second subroutine at a computing device, the first subroutine being structured to call the second subroutine;
generating data collection instructions;
executing the first subroutine, the second subroutine, and the data collection instructions in order to collect first unit regression test data;
storing the first unit regression test data in a memory device;
receiving a modified subroutine at the computing device;
generating a driver to call the modified subroutine using at least a portion of the first unit regression test data as an input to the modified subroutine;
executing the driver and the modified subroutine to collect second unit regression test data;
comparing at least a portion of the first unit regression test data to at least a portion of the second unit regression test data; and
generating a user message at the computing device, the user message indicating a test status based on the comparison.

25. A method as defined in claim 24, wherein the step of generating data collection instructions comprises the step of inserting entry collection instructions into the first subroutine, the entry collection instructions being structured to record a value of an input parameter passed to the first subroutine.

26. A method as defined in claim 25, wherein the step of inserting entry collection instructions comprises the step of inserting entry collection instructions structured to record a value of a parameter passed to the first subroutine as part of a call to the first subroutine.

27. A method as defined in claim 25, wherein the step of inserting entry collection instructions comprises the step of inserting entry collection instructions structured to record a value of an external variable used by the first subroutine.

28. A method as defined in claim 25, wherein the step of inserting entry collection instructions comprises the step of inserting entry collection instructions structured to record a value of a parameter returned to the first subroutine in response to a subroutine call made by the first subroutine.

29. A method as defined in claim 24, wherein the step of generating data collection instructions comprises the step of inserting exit collection instructions into the first subroutine, the exit collection instructions being structured to record a value of an output parameter passed from the first subroutine.

30. A method as defined in claim 29, wherein the step of inserting exit collection instructions comprises the step of inserting exit collection instructions structured to record a value of a parameter returned from the first subroutine in response to a call to the first subroutine.

31. A method as defined in claim 29, wherein the step of inserting exit collection instructions comprises the step of inserting exit collection instructions structured to record a value of an external variable used by the first subroutine.

32. A method as defined in claim 29, wherein the step of inserting exit collection instructions comprises the step of inserting exit collection instructions structured to record a value of a parameter passed by the first subroutine as part of a subroutine call made by the first subroutine.

33. A method as defined in claim 24, further comprising the steps of:
  recording a fist sequence of subroutine calls made by the first subroutine;
  recording a second sequence of subroutine calls made by the second subroutine; and
  comparing the first sequence of subroutine calls with the second sequence of subroutine calls.

34. A method as defined in claim 24, further comprising the steps of:
  combining a plurality of subroutines in an incremental workspace, each of the plurality of subroutines failing each of a plurality of corresponding unit tests due to an interface change;
  generating test code for the incremental workspace; and
  determining if the plurality of subroutines pass the test code.

35. A method of testing software, the method comprising the steps of:
  determining if a first modified subroutine passes plurality of unit test cases in a unit test workspace;
  determining if the first modified subroutine interfaces with a second modified subroutine;
  submitting the first modified subroutine to an incremental integration workspace if the first modified subroutine fails a unit test case in the plurality of unit test cases;
  submitting the first modified subroutine to the incremental integration workspace if the first modified subroutine interfaces with the second modified subroutine; and
  submitting the first modified subroutine to a system integration workspace if the first modified subroutine passes the plurality of unit test cases and the first modified subroutine does not interface with the second modified subroutine.

36. A method of testing software, the method comprising the steps of:
  receiving a first subroutine, a second subroutine, and a third subroutine, the first subroutine being structured to call the second subroutine, the second subroutine being structured to call the third subroutine;
  determining that a first previously passed test case fails by unit testing the second subroutine;
  determining that a second previously passed test case fails by unit testing the third subroutine;
  creating an incremental integrated software using the second subroutine and the third subroutine;
  determining that the incremental integrated software passes a third previously passed test case;
  creating an integrated software using the first subroutine, the second subroutine, and the third subroutine; and
  determining that the integrated software passes a fourth previously passed test case.

37. A method of preventing software modifications from invalidating previously passed software tests, the method comprising the steps of:
  grouping a plurality of modified subroutines together in an incremental workspace to create an integrated software, each of the subroutines in the integrated software interfacing with at least one other subroutine in the integrated software, the plurality of modified subroutines being a subset of subroutines required for a software product;
  determining a plurality of unit regression test cases to exercise the integrated software;
  generating a driver to exercise the integrated software using input data from the plurality of unit regression test cases;
  executing the driver and the plurality of modified subroutines;
  collecting outputs generated by the integrated software;
  comparing the outputs generated by the integrated software with output data from the plurality of unit regression test cases to produce a test result; and
  generating a message indicative of the test result.

38. A method as defined in claim 37, further comprising the steps of checking for a subroutine calling sequence error.

39. A computer readable memory device storing a computer program, the computer program being structured to cause a microprocessor to:
  receive a first subroutine, a second subroutine, and a third subroutine, the first subroutine being structured to call the second subroutine, the second subroutine being structured to call the third subroutine;
  generate data collection instructions, the data collection instructions being structured to collect a first input value associated with the second subroutine, the data collection instructions being structured to collect a first output value associated with the second subroutine;
  execute the first subroutine and the data collection instructions, the execution of the first subroutine causing the execution of the second subroutine, the execution of the second subroutine causing the execution of the third subroutine;
  store the first input value and the first output value collected by the data collection instructions in a memory device;
  receive a modified second subroutine at the computing device;
  generate a driver to exercise the modified second subroutine using the first input value;
  generate a stub to take the place of the third subroutine, the stub being structured to collect a second output value associated with the modified second subroutine;
  execute the driver, the driver causing the execution of the modified second subroutine, the execution of the modified second subroutine causing the execution of the stub;
  compare the first output value associated with the second subroutine and the second output value associated with the modified second subroutine; and generate a user message on an output device, the user message indicating a test status based on the comparison.

40. An apparatus for testing software, the apparatus comprising:

a microprocessor;

a user output device operatively coupled to the microprocessor, the user output device being structured to convert an electrical error signal into a human perceivable error signal; and a memory device operatively coupled to the microprocessor, the memory device storing a first subroutine, a second subroutine, a modified second subroutine, a third subroutine, and test software, the first subroutine being structured to call the second subroutine, the second subroutine being structured to call the third subroutine, the test software being structured to cause the microprocessor to:

generate data collection instructions, the data collection instructions being structured to collect a first input value associated with the second subroutine, the data collection instructions being structured to collect a first output value associated with the second subroutine;

execute the first subroutine and the data collection instructions, the execution of the first subroutine causing the execution of the second subroutine, the execution of the second subroutine causing the execution of the third subroutine;

store the first input value and the first output value collected by the data collection instructions in a memory device;

receive a modified second subroutine at the computing device;

generate a driver to exercise the modified second subroutine using the first input value;

generate a stub to take the place of the third subroutine, the stub being structured to collect a second output value associated with the modified second subroutine;

execute the driver, the driver causing the execution of the modified second subroutine, the execution of the modified second subroutine causing the execution of the stub;

compare the first output value associated with the second subroutine and the second output value associated with the modified second subroutine; and generate a user message on an output device, the user message indicating a test status based on the comparison.

41. An apparatus for testing software, the apparatus comprising:

a memory device storing a first subroutine, a second subroutine, a modified second subroutine, a third subroutine, and test software, the first subroutine being structured to call the second subroutine, the second subroutine being structured to call the third subroutine;

a test code generator structured to generate data collection instructions, a driver, and a stub, the data collection instructions being structured to collect a first input value associated with the second subroutine, the data collection instructions being structured to collect a first output value associated with the second subroutine, the driver being structured to exercise the modified second subroutine using the first input value associated with the second subroutine, the stub to take the place of the third subroutine, the stub being structured to collect a second output value associated with the modified second subroutine;

a code execution unit operatively coupled to the memory device and the test code generator, the code execution unit being structured to execute the first subroutine and the data collection instructions, the execution of the first subroutine causing the execution of the second subroutine, the execution of the second subroutine causing the execution of the third subroutine;

a test data collector operatively coupled to the code execution unit, the test data collector being structured to record the first input value and the first output value collected by the data collection instructions;

a test driver operatively coupled to the code execution unit, the test driver being structured to execute the driver, the driver causing the execution of the modified second subroutine, the execution of the modified second subroutine causing the execution of the stub; and a comparator operatively coupled to the code execution unit, the comparator being structured to compare the first output value associated with the second subroutine and the second output value associated with the modified second subroutine.

42. An apparatus for testing software as defined in claim 41, further comprising:

an error generator operatively coupled to the comparator, the error generator being structured to generate an electrical error signal if the first output value is different than the second output value; and a user output device operatively coupled to the error generator, the user output device being structured to convert the electrical error signal into a human perceivable error signal.

* * * * *